US010949029B2

(12) United States Patent
Harrison et al.

(10) Patent No.: US 10,949,029 B2
(45) Date of Patent: *Mar. 16, 2021

(54) METHOD AND APPARATUS FOR CLASSIFYING A TOUCH EVENT ON A TOUCHSCREEN AS RELATED TO ONE OF MULTIPLE FUNCTION GENERATING INTERACTION LAYERS

(71) Applicant: QEEXO, CO., Mountain View, CA (US)

(72) Inventors: Chris Harrison, Pittsburgh, PA (US); Julia Schwarz, Pittsburgh, PA (US); Leandro Damian Zungri, Ciudad Autonoma de Buenos Aires (AR)

(73) Assignee: QEEXO, CO., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/406,770

(22) Filed: Jan. 15, 2017

(65) Prior Publication Data

US 2018/0004319 A1 Jan. 4, 2018
US 2021/0041971 A9 Feb. 11, 2021

Related U.S. Application Data

(63) Continuation of application No. 14/751,589, filed on Jun. 26, 2015, now Pat. No. 9,612,689, which is a
(Continued)

(51) Int. Cl.
*G06F 3/043* (2006.01)
*G06F 3/041* (2006.01)
(Continued)

(52) U.S. Cl.
CPC ........... *G06F 3/043* (2013.01); *G06F 3/0416* (2013.01); *G06F 3/0482* (2013.01); *G06F 3/0488* (2013.01); *G06F 3/04842* (2013.01)

(58) Field of Classification Search
CPC ...... G06F 3/041; G06F 3/0412; G06F 3/0414; G06F 3/0416; G06F 3/042; G06F 3/0421;
(Continued)

(56) References Cited

U.S. PATENT DOCUMENTS 2,008,028 A  7/1935  McCortney
2,430,005 A  11/1947  Denneen
(Continued)

FOREIGN PATENT DOCUMENTS

CN  1161455  10/1997
CN  1797305 A  7/2006
(Continued)

OTHER PUBLICATIONS

Non-Final Office Action—dated Apr. 21, 2017—U.S. Appl. No. 15/075,648, filed on Mar. 21, 2016, titled: "Method and Apparatus for Differentiating Touch Screen Users Based on Touch Event Analysis."
(Continued)

*Primary Examiner* — Tom V Sheng
(74) *Attorney, Agent, or Firm* — Kwan & Olynick LLP

(57) ABSTRACT

A system for classifying touch events of different interaction layers includes a touch screen configured to display an interactive element, one or more vibro-acoustic sensors coupled to the touch screen, a touch event detector configured to monitor the one or more vibro-acoustic sensors and to save vibro-acoustic signals sensed by the one or more vibro acoustic sensors, wherein the touch event detector is further configured to detect touch events in which the interactive element is touched by a first or a second finger part of a user, and wherein the touch events result in generating the vibro-acoustic signals, and a vibro-acoustic classifier is configured to classify the vibro-acoustic signals
(Continued)

and activate corresponding functions in the different layers dependent upon which finger part is used.

24 Claims, 18 Drawing Sheets

Related U.S. Application Data continuation-in-part of application No. 14/612,089, filed on Feb. 2, 2015, now Pat. No. 9,864,454, which is a continuation of application No. 13/849,698, filed on Mar. 25, 2013, now Pat. No. 9,013,452.

(51) Int. Cl.
*G06F 3/0488* (2013.01)
*G06F 3/0482* (2013.01)
*G06F 3/0484* (2013.01)

(58) Field of Classification Search
CPC ...... G06F 3/0425; G06F 3/0428; G06F 3/043; G06F 3/0433; G06F 3/0436; G06F 3/044; G06F 3/045; G06F 3/046; G06F 3/047; G06F 3/048; G06F 3/0481; G06F 3/0482; G06F 3/0484; G06F 3/04842; G06F 3/04845; G06F 3/04847; G06F 3/0485; G06F 3/0486; G06F 3/0487; G06F 3/0488; G06F 3/03547
See application file for complete search history.

(56) References Cited

U.S. PATENT DOCUMENTS

| | | | |
|---|---|---|---|
| 3,118,435 A | 1/1964 | Almquist | |
| 3,354,531 A | 11/1967 | Pryor | |
| 4,561,105 A | 12/1985 | Crane | |
| 4,597,932 A | 7/1986 | Kurihara | |
| 4,686,332 A | 8/1987 | Greanias | |
| 5,483,261 A | 1/1996 | Yasutake | |
| 5,544,265 A | 8/1996 | Bozinovic | |
| 5,596,656 A | 1/1997 | Goldberg | |
| 5,615,285 A | 3/1997 | Beernink | |
| 5,625,818 A | 4/1997 | Zarmer | |
| 5,666,438 A | 9/1997 | Beernink | |
| 5,867,163 A | 2/1999 | Kurtenbach | |
| 5,933,514 A | 8/1999 | Ostrem | |
| 6,028,593 A | 2/2000 | Rosenberg | |
| 6,118,435 A | 9/2000 | Fujita | |
| 6,208,330 B1 | 3/2001 | Hasegawa et al. | |
| 6,212,295 B1 | 4/2001 | Ostrem | |
| 6,222,465 B1 | 4/2001 | Kumar | |
| 6,246,395 B1 | 6/2001 | Goyins | |
| 6,252,563 B1 | 6/2001 | Tada | |
| 6,323,846 B1 | 11/2001 | Vvesterman | |
| 6,337,698 B1 | 1/2002 | Keely, Jr. | |
| 6,492,979 B1 | 12/2002 | Kent | |
| 6,504,530 B1 | 1/2003 | Wilson | |
| 6,643,663 B1 | 11/2003 | Dabney | |
| 6,707,451 B1 | 3/2004 | Nagaoka | |
| 6,748,425 B1 | 6/2004 | Duffy | |
| 6,772,396 B1 | 8/2004 | Cronin | |
| 6,933,930 B2 * | 8/2005 | Devige | G06F 3/0433 178/18.04 |
| 6,943,665 B2 | 9/2005 | Chornenky | |
| 7,050,955 B1 | 5/2006 | Carmel | |
| 7,084,884 B1 | 8/2006 | Nelson | |
| 7,098,896 B2 | 8/2006 | Kushler | |
| 7,212,197 B1 | 5/2007 | Schkolne | |
| 7,443,396 B2 | 10/2008 | Ilic | |
| 7,581,194 B2 | 8/2009 | Iwema | |
| 7,982,724 B2 | 7/2011 | Hill | |
| 8,086,971 B2 | 12/2011 | Radivojevic | |
| 8,144,126 B2 | 3/2012 | Wright | |
| 8,154,524 B2 | 4/2012 | Wilson | |
| 8,154,529 B2 | 4/2012 | Sleeman | |
| 8,170,346 B2 | 5/2012 | Ludwig | |
| 8,199,126 B1 | 6/2012 | Taubman | |
| 8,253,744 B2 | 8/2012 | Macura | |
| 8,269,744 B2 | 9/2012 | Agari | |
| 8,327,029 B1 | 12/2012 | Purser | |
| 8,430,310 B1 | 4/2013 | Ho | |
| 8,441,790 B2 | 5/2013 | Pance | |
| 8,547,357 B2 | 10/2013 | Aoyagi | |
| 8,624,878 B2 | 1/2014 | Sarwar | |
| 8,670,632 B2 | 3/2014 | Wilson | |
| 8,674,943 B2 | 3/2014 | Westerman | |
| 8,743,091 B2 | 6/2014 | Bernstein | |
| 8,760,395 B2 | 6/2014 | Kim | |
| 8,762,332 B2 | 6/2014 | Keebler | |
| 8,769,524 B2 | 7/2014 | Bhullar | |
| 9,013,452 B2 * | 4/2015 | Harrison | G06F 3/0488 345/177 |
| 9,019,244 B2 | 4/2015 | Harrison | |
| 9,030,498 B2 | 5/2015 | Galor | |
| 9,052,772 B2 | 6/2015 | West | |
| 9,060,007 B2 | 6/2015 | Keebler | |
| 9,182,882 B2 | 11/2015 | Fowler | |
| 9,329,688 B2 | 5/2016 | Harrison | |
| 9,329,715 B2 | 5/2016 | Schwarz | |
| 9,377,863 B2 | 6/2016 | Bychkov | |
| 9,465,494 B2 | 10/2016 | Harrison | |
| 9,557,852 B2 | 1/2017 | Tsai | |
| 9,612,689 B2 * | 4/2017 | Harrison | G06F 3/043 |
| 9,696,859 B1 | 7/2017 | Heller | |
| 9,864,453 B2 | 1/2018 | Munemoto | |
| 9,864,454 B2 | 1/2018 | Harrison | |
| 10,082,935 B2 | 9/2018 | Harrison | |
| 10,318,034 B1 | 6/2019 | Hauenstein | |
| 2002/0009227 A1 | 1/2002 | Goldberg | |
| 2002/0057837 A1 | 5/2002 | Wilkinson | |
| 2002/0070927 A1 | 6/2002 | Fujitsuka | |
| 2002/0126161 A1 | 9/2002 | Kuzunuki | |
| 2003/0048260 A1 | 3/2003 | Matusis | |
| 2003/0110085 A1 | 6/2003 | Murren | |
| 2003/0132922 A1 | 7/2003 | Philipp | |
| 2003/0217873 A1 * | 11/2003 | Paradiso | G06F 3/0433 178/18.04 |
| 2004/0012573 A1 | 1/2004 | Morrison | |
| 2004/0021681 A1 | 2/2004 | Liao | |
| 2004/0054711 A1 | 3/2004 | Multer | |
| 2004/0141010 A1 | 7/2004 | Fitzmaurice | |
| 2004/0160421 A1 | 8/2004 | Sullivan | |
| 2004/0199867 A1 | 10/2004 | Brandenborg | |
| 2004/0225730 A1 | 11/2004 | Brown | |
| 2005/0083313 A1 | 4/2005 | Hardie-Bick | |
| 2005/0131778 A1 | 6/2005 | Bennett | |
| 2005/0146512 A1 | 7/2005 | Hill | |
| 2005/0146513 A1 | 7/2005 | Hill | |
| 2005/0289461 A1 | 12/2005 | Amado | |
| 2006/0010400 A1 | 1/2006 | Dehlin | |
| 2006/0026535 A1 | 2/2006 | Hotelling | |
| 2006/0031746 A1 | 2/2006 | Toepfer | |
| 2006/0132456 A1 | 6/2006 | Anson | |
| 2006/0152499 A1 | 7/2006 | Roberts | |
| 2006/0173985 A1 | 8/2006 | Moore | |
| 2006/0184617 A1 | 8/2006 | Nicholas | |
| 2006/0217126 A1 | 9/2006 | Sohm | |
| 2006/0230021 A1 | 10/2006 | Diab | |
| 2006/0288329 A1 | 12/2006 | Gandhi | |
| 2007/0011205 A1 | 1/2007 | Majjasie | |
| 2007/0044010 A1 | 2/2007 | Sull | |
| 2007/0075965 A1 | 4/2007 | Huppi | |
| 2007/0085157 A1 | 4/2007 | Fadell | |
| 2007/0100959 A1 | 5/2007 | Eichstaedt | |
| 2007/0109279 A1 | 5/2007 | Sigona | |
| 2007/0126716 A1 | 6/2007 | Haverly | |
| 2007/0168367 A1 | 7/2007 | Dickinson | |
| 2007/0186157 A1 | 8/2007 | Walker | |
| 2007/0192674 A1 | 8/2007 | Bodin | |
| 2007/0245020 A1 | 10/2007 | Ott, IV | |
| 2007/0257767 A1 | 11/2007 | Beeson | |
| 2007/0291297 A1 | 12/2007 | Harmon | |

(56) References Cited

U.S. PATENT DOCUMENTS

| | | |
|---|---|---|
| 2008/0005666 A1 | 1/2008 | Sefton |
| 2008/0036743 A1 | 2/2008 | Westerman |
| 2008/0042978 A1 | 2/2008 | Perez-Noguera |
| 2008/0082941 A1 | 4/2008 | Goldberg |
| 2008/0103906 A1 | 5/2008 | Singh |
| 2008/0117168 A1 | 5/2008 | Liu |
| 2008/0126388 A1 | 5/2008 | Naaman |
| 2008/0141132 A1 | 6/2008 | Tsai |
| 2008/0155118 A1 | 6/2008 | Glaser |
| 2008/0158147 A1 | 7/2008 | Westerman |
| 2008/0158168 A1 | 7/2008 | Westerman |
| 2008/0158185 A1 | 7/2008 | Westerman |
| 2008/0168403 A1 | 7/2008 | Westerman |
| 2008/0180406 A1 | 7/2008 | Han |
| 2008/0244468 A1 | 10/2008 | Nishihara |
| 2008/0288347 A1 | 11/2008 | Sifry |
| 2008/0319932 A1 | 12/2008 | Yih |
| 2009/0025987 A1 | 1/2009 | Perski |
| 2009/0073144 A1 | 3/2009 | Chen |
| 2009/0095540 A1 | 4/2009 | Zachut |
| 2009/0150373 A1 | 6/2009 | Davis |
| 2009/0157206 A1 | 6/2009 | Weinberg |
| 2009/0174679 A1 | 7/2009 | Westerman |
| 2009/0178011 A1 | 7/2009 | Ording |
| 2009/0231275 A1 | 9/2009 | Odgers |
| 2009/0232355 A1 | 9/2009 | Minear |
| 2009/0254869 A1 | 10/2009 | Ludwig |
| 2009/0259628 A1 | 10/2009 | Farrell |
| 2009/0262637 A1 | 10/2009 | Badaye |
| 2009/0315835 A1 | 12/2009 | De Goes et al. |
| 2009/0318192 A1 | 12/2009 | Leblanc |
| 2010/0036967 A1 | 2/2010 | Caine et al. |
| 2010/0060602 A1 | 3/2010 | Agari |
| 2010/0085216 A1 | 4/2010 | Ms |
| 2010/0094633 A1 | 4/2010 | Kawamura |
| 2010/0123666 A1 | 5/2010 | Wickholm et al. |
| 2010/0127997 A1 | 5/2010 | Park et al. |
| 2010/0194703 A1 | 8/2010 | Fedor |
| 2010/0214267 A1 | 8/2010 | Radivojevic |
| 2010/0225601 A1* | 9/2010 | Homma .............. G06F 3/0416 345/173 |
| 2010/0251112 A1 | 9/2010 | Hinckley |
| 2010/0265185 A1 | 10/2010 | Oksanen |
| 2010/0271322 A1 | 10/2010 | Kondoh |
| 2010/0274622 A1 | 10/2010 | Kennedy |
| 2010/0279738 A1* | 11/2010 | Kim .................. G06F 3/016 455/566 |
| 2010/0289754 A1 | 11/2010 | Sleeman |
| 2010/0302184 A1 | 12/2010 | East |
| 2010/0306649 A1 | 12/2010 | Russ |
| 2010/0309158 A1 | 12/2010 | Iwayama |
| 2010/0309933 A1 | 12/2010 | Stark |
| 2011/0003550 A1 | 1/2011 | Klinghult et al. |
| 2011/0007000 A1 | 1/2011 | Lim |
| 2011/0018825 A1* | 1/2011 | Kondo ............... G06F 3/0433 345/173 |
| 2011/0057670 A1 | 3/2011 | Jordan |
| 2011/0057885 A1 | 3/2011 | Lehtovirta |
| 2011/0074544 A1 | 3/2011 | D Souza |
| 2011/0074701 A1 | 3/2011 | Dickinson |
| 2011/0080349 A1 | 4/2011 | Holbein |
| 2011/0133934 A1 | 6/2011 | Tan |
| 2011/0134063 A1 | 6/2011 | Norieda |
| 2011/0134083 A1 | 6/2011 | Norieda |
| 2011/0141066 A1* | 6/2011 | Shimotani .......... G01C 21/3664 345/177 |
| 2011/0145706 A1 | 6/2011 | Wilson |
| 2011/0164029 A1 | 7/2011 | King |
| 2011/0167391 A1 | 7/2011 | Momeyer |
| 2011/0169763 A1 | 7/2011 | Westerman |
| 2011/0169778 A1 | 7/2011 | Nungester |
| 2011/0173235 A1 | 7/2011 | Aman |
| 2011/0175813 A1 | 7/2011 | Sarwar |
| 2011/0175821 A1 | 7/2011 | King |
| 2011/0187652 A1 | 8/2011 | Huibers |
| 2011/0202848 A1 | 8/2011 | Ismalon |
| 2011/0210943 A1 | 9/2011 | Zaliva |
| 2011/0231290 A1 | 9/2011 | Narcisse |
| 2011/0238613 A1 | 9/2011 | Shehory |
| 2011/0246463 A1 | 10/2011 | Carson, Jr. |
| 2011/0246503 A1 | 10/2011 | Bender |
| 2011/0248927 A1* | 10/2011 | Michaelis .......... G06F 3/04845 345/173 |
| 2011/0248948 A1 | 10/2011 | Griffin |
| 2011/0261083 A1 | 10/2011 | Wilson |
| 2011/0298798 A1 | 12/2011 | Krah |
| 2011/0310040 A1 | 12/2011 | Ben-Shalom |
| 2012/0001875 A1 | 1/2012 | Li |
| 2012/0007821 A1 | 1/2012 | Zaliva |
| 2012/0007836 A1 | 1/2012 | Wu |
| 2012/0011106 A1 | 1/2012 | Reid |
| 2012/0019562 A1 | 1/2012 | Park et al. |
| 2012/0051596 A1 | 3/2012 | Darnell |
| 2012/0056846 A1 | 3/2012 | Zaliva |
| 2012/0078942 A1 | 3/2012 | Cai |
| 2012/0096041 A1 | 4/2012 | Rao |
| 2012/0113017 A1 | 5/2012 | Benko |
| 2012/0120000 A1 | 5/2012 | Lucic et al. |
| 2012/0131139 A1 | 5/2012 | Siripurapu |
| 2012/0146938 A1 | 6/2012 | Worfolk |
| 2012/0150871 A1 | 6/2012 | Hua |
| 2012/0158629 A1 | 6/2012 | Hinckley |
| 2012/0200517 A1 | 8/2012 | Nikolovski |
| 2012/0206330 A1 | 8/2012 | Cao |
| 2012/0262407 A1 | 10/2012 | Hinckley |
| 2012/0274583 A1 | 11/2012 | Haggerty |
| 2012/0280827 A1 | 11/2012 | Kashiwagi |
| 2012/0280927 A1 | 11/2012 | Ludwig |
| 2012/0287056 A1 | 11/2012 | Ibdah |
| 2012/0287076 A1 | 11/2012 | Dao |
| 2012/0313969 A1 | 12/2012 | Szymczyk |
| 2012/0324349 A1 | 12/2012 | Pop-Lazarov |
| 2013/0009896 A1 | 1/2013 | Zaliva |
| 2013/0014248 A1 | 1/2013 | McLaughlin |
| 2013/0027404 A1 | 1/2013 | Sarnoff |
| 2013/0038554 A1 | 2/2013 | West |
| 2013/0091123 A1 | 4/2013 | Chen |
| 2013/0100071 A1 | 4/2013 | Wright |
| 2013/0141382 A1 | 6/2013 | Simmons |
| 2013/0176264 A1 | 7/2013 | Alameh |
| 2013/0176270 A1 | 7/2013 | Cattivelli |
| 2013/0179773 A1 | 7/2013 | Lee |
| 2013/0187883 A1 | 7/2013 | Lim |
| 2013/0215070 A1 | 8/2013 | Sasaki |
| 2013/0234982 A1 | 9/2013 | Kang |
| 2013/0246861 A1 | 9/2013 | Colley |
| 2013/0257757 A1 | 10/2013 | Kim |
| 2013/0265269 A1 | 10/2013 | Sharma |
| 2013/0285942 A1 | 10/2013 | Ko |
| 2013/0287273 A1 | 10/2013 | Huang |
| 2013/0307814 A1 | 11/2013 | Chang |
| 2013/0307828 A1 | 11/2013 | Miller |
| 2013/0316813 A1 | 11/2013 | Derome |
| 2013/0328813 A1 | 12/2013 | Kuo |
| 2013/0335333 A1 | 12/2013 | Kukulski |
| 2014/0007002 A1 | 1/2014 | Chang |
| 2014/0009401 A1 | 1/2014 | Baja |
| 2014/0022189 A1 | 1/2014 | Sheng |
| 2014/0032880 A1 | 1/2014 | Ka |
| 2014/0037951 A1 | 2/2014 | Shigetomi |
| 2014/0071095 A1 | 3/2014 | Godsill |
| 2014/0082545 A1 | 3/2014 | Zhai |
| 2014/0104191 A1 | 4/2014 | Davidson |
| 2014/0104192 A1 | 4/2014 | Davidson |
| 2014/0104274 A1 | 4/2014 | Hilliges |
| 2014/0109004 A1 | 4/2014 | Sadhvani et al. |
| 2014/0168116 A1 | 6/2014 | Sasselli |
| 2014/0192023 A1 | 7/2014 | Hoffman |
| 2014/0208275 A1 | 7/2014 | Mongia |
| 2014/0210788 A1 | 7/2014 | Harrison et al. |
| 2014/0210791 A1 | 7/2014 | Hanauer |
| 2014/0240271 A1 | 8/2014 | Land |
| 2014/0240295 A1 | 8/2014 | Harrison |
| 2014/0253477 A1 | 9/2014 | Shim |

(56) References Cited

U.S. PATENT DOCUMENTS

| | | |
|---|---|---|
| 2014/0267065 A1 | 9/2014 | Levesque |
| 2014/0267085 A1 | 9/2014 | Li |
| 2014/0289659 A1 | 9/2014 | Harrison et al. |
| 2014/0300559 A1 | 10/2014 | Tanimoto |
| 2014/0327626 A1 | 11/2014 | Harrison et al. |
| 2014/0331313 A1 | 11/2014 | Kim |
| 2014/0368436 A1 | 12/2014 | Abzarian |
| 2015/0002405 A1 | 1/2015 | Kuan |
| 2015/0035759 A1 | 2/2015 | Harrison et al. |
| 2015/0077378 A1 | 3/2015 | Duffield |
| 2015/0145820 A1* | 5/2015 | Huang ............... G06F 3/044 345/174 |
| 2015/0242009 A1 | 8/2015 | Xiao et al. |
| 2015/0253858 A1 | 9/2015 | Koukoumidis |
| 2015/0293592 A1* | 10/2015 | Cheong ............... G06F 3/016 345/173 |
| 2016/0012348 A1 | 1/2016 | Johnson |
| 2016/0018942 A1* | 1/2016 | Kang ............... G06F 3/0416 345/173 |
| 2016/0062545 A1 | 3/2016 | Lai |
| 2016/0077615 A1 | 3/2016 | Schwarz et al. |
| 2016/0077650 A1 | 3/2016 | Durojaiye |
| 2016/0077664 A1 | 3/2016 | Harrison et al. |
| 2016/0085324 A1 | 3/2016 | Schwarz et al. |
| 2016/0085333 A1 | 3/2016 | Christopher |
| 2016/0085372 A1 | 3/2016 | Munemoto et al. |
| 2016/0098185 A1 | 4/2016 | Xiao et al. |
| 2016/0117015 A1* | 4/2016 | Veneri ............... B81B 7/0045 345/174 |
| 2016/0156837 A1 | 6/2016 | Rodzevski |
| 2016/0171192 A1 | 6/2016 | Holz |
| 2016/0224145 A1 | 8/2016 | Harrison et al. |
| 2016/0231865 A1 | 8/2016 | Harrison et al. |
| 2016/0299615 A1 | 10/2016 | Schwarz et al. |
| 2017/0024892 A1 | 1/2017 | Harrison et al. |
| 2017/0060279 A1 | 3/2017 | Harrison |
| 2017/0153705 A1 | 6/2017 | Kim |

FOREIGN PATENT DOCUMENTS

| | | |
|---|---|---|
| CN | 1928781 A | 3/2007 |
| CN | 101111817 A | 1/2008 |
| CN | 101299174 A | 11/2008 |
| CN | 101339477 A | 1/2009 |
| CN | 101410781 A | 4/2009 |
| CN | 101424974 A | 5/2009 |
| CN | 101438218 A | 5/2009 |
| CN | 101763190 A | 6/2010 |
| CN | 101763193 A | 6/2010 |
| CN | 101921610 A | 12/2010 |
| CN | 101968696 A | 2/2011 |
| CN | 102004925 | 4/2011 |
| CN | 102153776 A | 8/2011 |
| CN | 102362249 A | 2/2012 |
| CN | 102789332 A | 11/2012 |
| CN | 103150019 A | 6/2013 |
| CN | 104020878 A | 9/2014 |
| CN | 104160364 | 11/2014 |
| EP | 0938039 A2 | 8/1999 |
| EP | 1659481 A2 | 5/2006 |
| EP | 1762926 A2 | 3/2007 |
| EP | 2136358 A1 | 12/2009 |
| EP | 2280337 A2 | 2/2011 |
| GB | 2344894 A | 6/2000 |
| GB | 2468742 A | 9/2010 |
| JP | H0969137 A | 3/1997 |
| JP | 2004213312 A | 7/2004 |
| JP | 2005018611 A | 1/2005 |
| JP | 2007524970 A | 8/2007 |
| JP | 2009543246 A | 12/2009 |
| JP | 2011028555 A | 2/2011 |
| JP | 2013519132 A | 5/2013 |
| JP | 2013532495 A | 8/2013 |
| KR | 1020020075283 A | 10/2002 |
| KR | 20110061227 A | 6/2011 |
| KR | 20120100351 A | 9/2012 |
| WO | 9404992 A1 | 3/1994 |
| WO | 2006070044 A1 | 7/2006 |
| WO | 2008126347 A1 | 10/2008 |
| WO | 2009071919 A1 | 6/2009 |
| WO | 2011096694 A2 | 8/2011 |
| WO | 2012064034 A1 | 5/2012 |
| WO | 2012166277 A1 | 12/2012 |
| WO | 2013061998 A1 | 5/2013 |
| WO | 2014037951 A1 | 3/2014 |
| WO | 2014182435 A1 | 11/2014 |
| WO | 2013059488 A1 | 1/2017 |

OTHER PUBLICATIONS

Non-Final Office Action—dated Dec. 1, 2016—U.S. Appl. No. 14/486,800, filed on Sep. 15, 2014, titled: "Method and Apparatus for Resolving Touch Screen Ambiguities."

Non-Final Office Action—dated Feb. 2, 2017, U.S. Appl. No. 14/191,329, filed on Feb. 26, 2014. titled: "Using Capacitive Images for Touch Type Classification."

Non-Final Office Action—dated Jun. 13, 2016—U.S. Appl. No. 14/751,589, filed on Jun. 26, 2015, titled: "Method and Apparatus for Classifying a Touch Event on a Touch Screen as Related One of Multiple Function Generating Interaction Layers and Activating a Function in the Selected Interaction Layer."T"He Selected Interaction Layer."

Non-Final Office Action—dated May 16, 2017—U.S. Appl. No. 14/503,894, filed on Oct. 1, 2014, titled: "Method and Apparatus for Addressing Touch Discontinuities."

Non-Final Office Action—dated Nov. 10, 2016, U.S. Appl. No. 13/958,427, filed on Aug. 2013, titled: "Capture of Vibro-Acoustic Data Used to Determine Touch Types."

Non-Final Office Action—dated Apr. 6, 2015—U.S. Appl. No. 13/887,711 filed May 6, 2013, titled: "Using Finger Touch Types to Interact with Electronic Devices".

Non-Final Office Action—dated Mar. 13, 2015—U.S. Appl. No. 13/958,427 filed Mar. 23, 2013, titled: "Capture of Vibro-Acoustic Data Used to Determine Touch Types".

Non-Final Office Action—dated Oct. 16, 2014—U.S. Appl. No. 13/780,494, filed Feb. 28, 2013 titled: "Input Tools Having Viobro-Acoustically Distinct Regions and Computing Device for Use With the Same."

Non-Final Office Action—dated Oct. 1, 2015—U.S. Appl. No. 14/462,604 filed Sep. 22, 2014, titled: "Method and Apparatus for Improving Accuracy of Touch Screen Event Analysis by Use of Edge Classification".

Non-Final Office Action—dated Oct. 2, 2015—U.S. Appl. No. 14/486,800 filed Sep. 15, 2014, titled: "Method and Apparatus for Resolving Touch Screen Ambiguities".

Non-Final Office Action—dated Oct. 7, 2015—U.S. Appl. No. 14/495,041 filed Sep. 24, 2014, titled: "Method for Improving Accuracy of Touch Screen Event Analysis by Use of Spatiotemporal Touch Patterns".

U.S. Appl. No. 13/887,711, filed May 6, 2013 titled: "Using Finger Touch Types to Interact with Electronic Devices."

U.S. Appl. No. 13/958,427, filed Aug. 2, 2013 titled: "Capture of Vibro-Acoustic Data Used to Determine Touch Types."

U.S. Appl. No. 14/191,329, filed Feb. 26, 2014 titled: "Using Capacitive Images or Touch Type Classification."

U.S. Appl. No. 14/242,127, filed Apr. 1, 2014 titled: "Method and Apparatus for Classifying Touch Events on a Touch Sensitive Surface."

U.S. Appl. No. 14/483,150, filed Sep. 11, 2014 titled: "Method and Apparatus for Differentiating Touch Screen Users Based on Touch Event Analysis."

U.S. Appl. No. 14/492,604, filed Sep. 22. 2014 titled: "Method and Apparatus for Improving Accuracy of Touch Screen Event Analysis by Use of Edge Classification."

U.S. Appl. No. 14/495,041, filed Sep. 24, 2014 titled: "Method for Improving Accuracy of Touch Screen Event Analysis by Use of Spatiotemporal Touch Patterns."

(56) References Cited

OTHER PUBLICATIONS

U.S. Appl. No. 14/191,329, filed Feb. 26, 2014, titled "Using Capacitive Images for Touch Type Classification".
U.S. Appl. No. 14/242,127, filed Apr. 1, 2014 "Method and Apparatus for Classifying Touch Events on a Touch Sensitive Surface".
U.S. Appl. No. 14/483,150, filed Spe. 11, 2014, titled "Method and Apparatus for Differentiating Touch Screen Users Based on Touch Event Analysis".
Final Office Action—dated Aug. 26, 2016—U.S. Appl. No. 14/219,919, filed Mar. 19, 2014, titled "Method and Device for Sensing Touch Input."
Final Office Action—dated Dec. 20, 2016—U.S. Appl. No. 15/073,407, filed Mar. 17, 2016, titled: "Input Tools Having Viobro-Acoustically Distinct Regions and Computing Device Foruse With the Same."
Final Office Action—dated Jan. 18, 2017—U.S. Appl. No. 14/684,407, filed Apr. 12, 2015, titled, "Method and Apparatus for Classifying Contacts with a Touch Sensitive Device."
Final Office Action—dated Jun. 8, 2017—U.S. Appl. No. 13/887,711, filed May 6, 2013, titled, "Using Finger Touch Types to Interact with Electronic Devices."
Final Office Action—dated May 1, 2017—U.S. Appl. No. 14/834,434, filed Aug. 24, 2015, titled, "Touch Sensitive Device with Multi-Sensor Stream Synchronized Data."
Final Office Action—dated Aug. 7, 2015—U.S. Appl. No. 14/191,329 filed Feb. 26, 2014, titled: "Using Capacitive Images for Touch Type Classification".
Final Office Action—dated Jun. 19, 2015—U.S. Appl. No. 13/958,427 filed Mar. 23, 2013, titled: "Capture of Vibro-Acoustic Data Used to Determine Touch Types".
Non-Final Office Action—dated Oct. 16, 2014, U.S. Appl. No. 13/780,494.
Non-Final Office Action—dated Nov. 25, 2016, U.S. Appl. No. 14/495,041, filed Sep. 24, 2014, titled: "Method for Improving Accuracy of Touch Screen Event Analysis by Use of Spatiotemporal Touch Patterns."
Non-Final Office Action—dated Apr. 19, 2017—U.S. Appl. No. 14/869,998, filed on Sep. 30, 2015, titled: "Determining Pitch and Yaw for Touchscreen Interactions."
Olwal, Alex, Wilson, Andrew; SurfaceFusion: Unobtrusive Tracking of Everyday Objects in Tangible User Interfaces; Proceedings of GI, 2008; pp. 235-242; 2008.
Paradiso, Joseph, HSIAO, Kai-yuh, Strickton, Joshua, Lifton, Joshua, Adler, Ari; Sensor Systems for Interactive Surfaces; IBM Systems Journal, 39(3-4); pp. 8992-914; 2000.
Paradiso, Joseph, Leo, Che King; Tracking and Characterizing Knocks Atop Large Interactive Displays; Sensor Review, 25(2); pp. 134-143; 2005.
Patten, James, Ishii, Hiroshi, Hines, Jim, Pangaro, Gian; Sensetable: A Wireless Object Tracking Platform for Tangible User Interfaces; Proceedings of CHI, 2001; pp. 253-260; 2001.
Rekimoto, Jun, Saitoh, Masanori; Augmented Surfaces: A Spatially Continuous Work Space for Hybrid Computing Environments; Proceedings of CHI, 1999; pp. 378-385; 1999.
Rekimoto, Jun, Sciammarella, Eduardo; TooiStone: Effective use of the Physical Manipulation Vocabularies of Input Device; Proceedings of UIST, 2000; pp. 109-117; 2000.
Rekimoto, Jun; SmartSkin: An Infrastructure for Freehand Manipulation on Interactive Surfaces; Proceedings of CHI, 2002; pp. 113-120;2002.
Steven Vigneaux, Director of Product Management, Mimio, "Choosing and Installing a Whiteboard for a Touch Projector", www.mimio.boxlight.com, Jan. 15, 2020, 10 pages.
Vandoren, Peter, Van Laerhoven, Tom, Claesen, Luc, Taelman, Johannes, Di Fiore, Fabian, Van Reeth, Frank, Flerackers, Eddy; DIP-IT: Digital Infrared Painting on an Interactive Table; Proceedings of CHI, 2008; pp. 2901-2906;2008.
Wang, Feng, Ren, Xiangshi; Empirical Evaluation for Finger Input Properties in Multi-Touch Interaction; Proceedings of CHI, 2009; pp. 1063-1072; 2009.

Asano, Futoshi, Goto, Masataka, Itou, Katunobu, Asoh, Hideki; Real-Time Sound Source Localization and Seperation System and Its Application to Automatic Speech Recognition; Proceedings of Eurospeech, 2001; pp. 1013-1016; 2001.
Benko, Hrvoje, Wilson, Andrew, Balakrishnan, Ravin; Sphere: Multi-Touch Interactions on a Spherical Display; Proceedings of UIST, 2008; pp. 77-86; 2008.
Burges, Christopher; A Tutorial on Support Vector Machines for Pattern Recognition; Data Mining and Knowledge Discovery, 2; pp. 121-167; 1998.
Deyle, Travis, Palinko, Szaboics, Poole, Erika Shehan, Starner, Thad; Hambone: A Bio-Acoustic Gesture Interface; Proceedings of ISWC, 2007; pp. 1-8; 2007.
Dietz, Paul, Harsham, Bret, Forlines, Clifton, Leigh, Darren, Yerazunis, William, Shipman, Sam, Schmidt-Nielsen, Bent, Ryall, Kathy; DT Controls: Adding Identity to Physical Interfaces; ACM Symposium on User Interface Software & Technology (UIST); pp. 245-252; 2005.
Dietz, Paul, Leigh, Darren; DiamonTouch: A Multi-User Touch Technology; ACM Symposium of User Interface Software & Technology {UIST}; pp. 219-226; 2001.
European Patent Office Extended Search Report for EP 14 79 4212; dated Nov. 9, 2016.
European Patent Office Extended Search Report for EP 14 83 2247; dated Feb. 23, 2017.
Gao, Xiang, Wilson, Andrew, Balakrishnan, Ravin, Hinckley, Ken, Hudson, Scott; ShapeTouch: Leveraging Contact Shape on Interactive Surfaces; IEEE International Workshop on Horizontal Interactive Human Computer System (Tabletop); pp. 139-146; 2008.
Gutwin, Carl, Greenberg, Saul, Blum, Roger, Dyck, Jeff, Tee, Kimberly, McEwan, Gregor; Supporting Informal Collaboration in Shared-Workspace Groupware; Journal of Universal Computer Science, 14(9); pp. 1411-1434; 2008.
Hall, Mark, Frank, Eibe, Holmes, Geoffrey, Pfahringer, Bernhard, Reutemann, Peter, Widen, Ian; The WEKA Data Mining Software: an Update; SIGKDD Explorations, 11(1); pp. 10-18; 2009.
Harrison, Chris, Hudson, Scott; Scratch Input: Creating Large, Inexpensive, Unpowered and Mobile Finger input Surfaces; Proceedings of UIST, 2008; pp. 205-208; 2008.
Harrison, Chris, Tan, Denney, Morris, Dan; Skinput: Appropriating the Body as an Input Surface; Proceedings of CHI, 2010; pp. 453-462; 2010.
Hartmann, Bjorn, Ringel Morris, Meredith, Benko, Hrvoje, Wilson, Andrew; Augmenting Interactive Tables with Mice & Keyboards; Proceedings of UIST, 2009; pp. 149-152; 2009.
Hinckley, Ken, Song, Hyunyoung; Sensor Synaesthesia: Touch in Motion, and Motion in Touch; Proceedings of CHI, 2011; pp. 801-810; 2011.
Hinckley, Ken, Yatani, Koji, Pahud, Michel, CODDINGTON, Nicole, Rodenhouse, Jenny, Wilson, Andy, Benko, Hrvoje, Buxton, Bill; Pen+ Touch= New Tools; Proceedings of UIST, 2010; pp. 27-36; 2010.
Hinkley, Ken, Yatani, Koji, Pahud, Michel, Coddington, Nicole, Rodenhouse, Jenny, Wilson, Andy, Benko, Hrvoje, Buxton, Bill; Manual Deskterity: an Exploration of Simultaneous Pen+ Touch Direct Input; Proceedings of Chi, 2010; pp. 2793-2802; 2010.
Holz, Christian, Baudisch, Patrick; the Generalized Perceived Input Point Model and How to Double Touch Accuracy by Extracting Fingerprints; Proceedings of CHI, 201 0; pp. 581-590; 2010.
'inal Office Action—dated Mar. 17, 2017—U.S. Appl. No. 14/492,604, filed on Sep. 22, 2014, titled: "Method and Apparatus for Improving Accuracy of Touch Screen Event Analysis by Use of Edge Classification."
Internal Search Report and Written Opinion received for PCT Application No. PCT/US2012/060865 dated Mar. 9, 2013, 10 pages.
Internal Search Report and Written Opinion received for PCT Application No. PCT/US2014/049485, dated Nov. 17, 2014. 13 pages.
International Search Report and Written Opinion for PCT/US2012/060865; dated Mar. 29,2013.
International Search Report and Written Opinion for PCT/US20151014581; dated May 14, 2015.

(56) References Cited

OTHER PUBLICATIONS

International Search Report and Written Opinion for PCT/US2015/047428; dated Nov 27, 2015.
International Search Report and Written Opinion for PCT/US2015/047616; dated Jul. 1, 2016.
International Search Report and Written Opinion for PCT/U52015/050570; dated Dec. 17, 2015.
International Search Report and Written Opinion for PCT/US2015/051108; dated Jan 28; 2016.
International Search Report and Written Opinion for PCT/US2015/051355; dated Dec. 15, 2015.
International Search Report and Written Opinion for PCT/US2015/051582; dated Feb. 26, 2016.
International Search Report and Written Opinion for PCT/US2016/040194; dated Sep. 19, 2016.
International Search Report and Written Opinion for PCT/US2016/044552; dated Oct. 17, 2016.
International Search Report and Written Opinion received for PCT Application No. PCT/U52012!060865 dated Mar. 29, 201310 pages.
International Search Report and Written Opinion received for PCT Application No. PCT/US2014/033380 dated on Mar. 13, 2015.
International Search Report and Written Opinion received for PCT Application No. PCT/US2014/034977 dated on Sep. 18, 2014.
International Search Report and Written Opinion received for PCT Application No. PCT/US2014/049485 dated on Nov. 17, 201413 pages.
International Search Search Report and Written Opinion received for PCT Application No. PCT/US2014/049485 dated Nov. 17,2014.
International Search Report and Written Opinion received for PCT Application No. PCT/US2014/34977 dated Sep. 18, 201412 pp.
International Search Report and Written Opinion received for PCT Application No. PCT/US2014/34977 dated Sep. 18, 2014, 12 pages.
Kal Ten Brunner, Martin, Bencina, Ross; reacTiVision: A Computer-Vision Framework for Table-Based Tangible Interaction; Proceedings ofTEI, 2007; pp. 69-74; 2007.
Matsushita, Nobuyuki, Rekimoto, Jun; HoloWall: Designing a Finger, Hand, Body, and Object Sensitive Wall; Proceedings of UIST, 1997; pp. 209-210; 1997.
U.S. Appl. No. 14/219,919, Non-Final Rejection, dated Dec. 11, 2019, 25 pgs.
U.S. Appl. No. 15/815,679, Final Rejection, dated Jan. 16, 2020, 19 pgs.
Schwarz, J. et al., "Probabilistic Palm Rejection Using Spatiotemporal Touch Features and Iterative Classification," Proceedings of the SIGCHI Conference on Human Factors in Computing Systems, pp. 2009-2012, Apr. 26-May 1, 2014.
Search Report dated Apr. 21, 2017 in Chinese Patent Application No. 201580000833.0, 1 page.
Kherallah, M et al., "On-line handwritten digit recognition based on trajectory and velocity modeling," Pattern Recognition Letters, vol. 29, Issue 5, pp. 580-594, Apr. 1, 2008.
Chinese Office Action for Chinese Patent Application No. 201280062500.7, dated Apr. 27, 2018, 19 pages (with English Translation).
Chinese Office Action for Chinese Patent Application No. 201280062500.7, dated Oct. 10, 2018, 14 pages.
Office Action dated Mar. 30, 2018 for U.S. Appl. No. 15/886,562, 44 pages.
Office Action dated Aug. 10, 2018 for U.S. Appl. No. 15/886,562, 86 pages.
Japanese Office Action dated Aug. 1, 2018 for Japanese Patent Application No. 2017-049566, 9 pages (including English translation).
Korean Office Action dated Jan. 10, 2019 for Korean Patent Application No. 2014-7010323, 11 pages (including English translation).
Office Action dated Jan. 28, 2019 for U.S. Appl. No. 15/836,798, 30 pages.
U.S. Appl. No. 13/780,494, filed Feb. 28, 2013, titled: "Input Tools Having Viobro-Acoustically Distinct Regions and Computing Device for Use With the Same." 34 pages.
S. Furui, "Digital Speech Processing, synthesis, and recognition" Marcel Dekker, Inc. 2001. 40 pages.
English Translation of Final Rejection dated Apr. 27, 2015 in Korean Patent Application No. 10-2014-0027979, 3 pages.
English Translation of Final Rejection mailed Dec. 12, 2014 in Korean Patent Application No. 10-2014-0027979, 3 pages.
English Translation of First Office Action dated Feb. 27, 2017 in Chinese Application No. 201480002879.1, 13 pages.
English Translation of First Office Action dated May 2, 2017 in Chinese Patent Application No. 201580000833.0, 9 pages.
English Translation of Second Office Action dated Jul. 6, 2017 in Chinese Application No. 201480002879.1, 14 pages.
English Translation of Third Office Action dated Oct. 16, 2017 in Chinese Application No. 201480002879.1, 4 pages.
Weidong, S. et al., "SenGuard: Passive user identification on smartphones using multiple sensors," IEEE 7th International Conference on Wireless and Mobile Computing, Networking and Communications (WiMob), pp. 141-148, 2011.
Chinese Office Action dated Apr. 21, 2017 for Chinese Patent Application No. 201480022056.5, 23 pages (with Translation).
Chinese Office Action dated Feb. 9, 2018 for Chinese Patent Application No. 201480022056.5, 19 pages (with Translation).
Third Chinese Office Action received for Chinese Patent Application No. 201480022056.5 dated Jul. 19, 2018, 6 pages (with English translation).
Communication pursuant to Article 94(3) EPC for European Patent Application No. 14785422.8 dated Nov. 22, 2018, 5 pages.
Communication pursuant to Article 94(3) EPC for European Patent Application No. 15840819.5 dated Jan. 23, 2019, 6 pages.
Communication pursuant to Article 94(3) EPC for European Patent Application No. 15842839.1 dated Apr. 9, 2019, 7 pages.
Communication pursuant to Article 94(3) EPC for European Patent Application No. 15843933.1 dated Jan. 23, 2019, 6 pages.
Chinese Second Office Action received for Chinese Patent Application No. 201580000833.0 dated Jan. 15, 2018, 17 pages.
First Office Action received for Canadian Patent Application No. 2869699, dated Nov. 27, 2014, 3 pages.
Second Office Action received for Canadian Patent Application No. 2869699, dated Jun. 14, 2016, 4 pages.
Communication pursuant to Article 94(3) EPC received for European Patent Application No. 14832247.2 dated May 3, 2019, 7 pages.
European Search Report dated Apr. 8, 2019 for European Application No. 18195588.1, 7 pages.
Non-Final Office Action received for U.S. Appl. No. 14/684,407 dated Aug. 2, 2017, 14 pages.
Final Office Action received for U.S. Appl. No. 14/684,407 dated Mar. 12, 2018, 14 pages.
Non-Final Office Action received for U.S. Appl. No. 14/612,089 dated May 31, 2017, 21 pages.
Non-Final Office Action received for U.S. Appl. No. 14/483,150 dated Dec. 18, 2015, 7 pages.
Non-Final Office Action received for U.S. Appl. No. 14/503,894, dated Dec. 30, 2015, 18 pages.
Non-Final Office Action-dated Jan. 29, 2016 U.S. Appl. No. 14/219,919, 11 pages.
Final Office Action dated Feb. 24, 2016 U.S. Appl. No. 13/887,711, 23 pages.
"Mimio", http://www.mimio.com, retrieved Jul. 8, 2019, 8 pages.
Final Office Action issued for U.S. Appl. No. 15/206,554 dated Feb. 1, 2017, 20 pages.
Chinese Office Action for Chinese Patent Application No. 201280062500.7 dated Nov. 7, 2016, 9 pages.
Seo et al., "Audio Fingerprinting Based on Normalized Spectral Subband Centroids," Proc. ICASSP, (U.S.A.), 2005, vol. 3, pp. 213-216. Retrieved on May 29, 2017, 4 pages.
Kashino, K., "Audio fingerprinting: Techniques and applications", Acoustical Science and Technology, The Acoustical Society of Japan, Feb. 1, 2010, vol. 66, No. 2, p. 71-76. Retrieved on May 29, 2017, 6 pages.

(56) References Cited

OTHER PUBLICATIONS

European Search Report received for European Patent Application No. 12842495.9, dated Jul. 24,2015, 7 pages.
Chinese Search Report dated Mar. 29, 2016 for Chinese Application No. 201280062500.7, 1 page.
Chinese Office Action dated Apr. 15, 2016 for Chinese Application No. 201280062500.7, 11 pages.
Japanese Office Action for Japanese Patent Application No. 2014-537253 dated Nov. 15, 2016, 3 pages.
Japanese Office Action for Japanese Patent Application No. 2014-537253 dated Apr. 26, 2016, 3 pages.
Communication pursuant to Article 94(3) EPC for EP Application No. 12842495.9 dated Jun. 18, 2018, 4 pages.
Non-Final Office Action received for U.S. Appl. No. 14/684,407 dated Jul. 8, 2016, 11 pages.
English Translation of Decision of Refusal dated Nov. 10, 2016 in Japanese Patent Application No. 2014-537253.
English Translation of First Office Action dated Apr. 15, 2016 in Chinese Patent Application No. 201280062500.7.
English Translation of Notification of Reasons for Refusal dated Apr. 15, 2016 in Japanese Patent Application No. 2014-537253.
English Translation of Office Action dated May 9, 2017 in Japanese Patent Application No. 2014-537253.
English Translation of Second Office Action dated Nov. 7, 2016 in Chinese Patent Application No. 201280062500.7.
U.S. Appl. No. 15/832,080, Non-Final Rejection, dated Mar. 9, 2020,13 pgs.
U.S. Appl. No. 15/832,080, OA.Appendix—Office Action Appendix, dated Mar. 9, 2020, 1 pg.
Non-Final Office Action received for U.S. Appl. No. 14/242,127 dated Jun. 2, 2015, 33 pages.
Final Office Action received for U.S. Appl. No. 14/242,127 dated Sep. 18, 2015, 28 pages.
Non-Final Office Action received for U.S. Appl. No. 14/242,127 dated Dec. 28, 2015, 38 pages.
Final Office Action received for U.S. Appl. No. 14/242,127 dated Mar. 31, 2016, 34 pages.
Notice of Allowance received for U.S. Appl. No. 14/242,127 dated Apr. 13, 2016, 18 pages.
Notice of Allowance received for U.S. Appl. No. 14/242,127 dated Sep. 2, 2016, 16 pages.
Non-Final Office Action received for U.S. Appl. No. 15/206,554 dated Sep. 21, 2016, 36 pages.
Japanese Office Action for Japanese Patent Application No. 2014-537253 dated May 16, 2017, 5 pages (including English Translation).
Japanese Office Action for Japanese Patent Application No. 2017-049566 dated Jun. 5, 2018, 7 pages (including English Translation).
Non-Final Office Action received for U.S. Appl. No. 14/684,407, dated Sep. 14, 2018, 24 pages.
Non-Final Office Action received dated Nov. 5, 2015 U.S. Appl. No. 13/887,711, 19 pages.
Non-Final Office Action dated Jun. 13, 2016 in U.S. Appl. No. 15/073,407, 49 pages.
Final Office Action dated Nov. 28, 2014 in U.S. Appl. No. 13/849,698, 21 pages.
Non-Final Office Action dated Jun. 24, 2014 in U.S. Appl. No. 13/849,698, 21 pages.
U.S. Appl. No. 14/492604, filed Sep. 22, 2014, titled: "Method and Apparatus for Improving Accuracy of Touch Screen Event Analysis by Use of Edge Classification." 35 pages.
U.S. Appl. No. 14/495,041, Filed on Sep. 24,2014, titled: "Method for Improving Accuracy of Touch Screen Event Analysis by Use of Spatiotemporal Touch Patterns." 34 pages.
U.S. Appl. No. 14/483150, filed Sep. 11,2014, titled: "Method and Apparatus for Differentiating Touch Screen Users Based on Touch Event Analysis.", 38 pages.
U.S. Appl. No. 13/849,698, filed Mar. 25, 2013, titled: "Method and System for Activating Different Interactive Functions Using Different Types of Finger Contacts.", 52 pages.

Final Office Action dated Jul. 12, 2017 in U.S. Appl. No. 14/495,041, 14 pages.
Final Office Action dated Jul. 18, 2017 in U.S. Appl. No. 14/191,329, 17 pages.
Final Office Action dated Jun. 8, 2016 in U.S. Appl. No. 14/495,041, 16 pages.
Final Office Action dated Jun. 30, 2017 in U.S. Appl. No. 13/958,427, 15 pages.
Final Office Action dated Mar. 28, 2016 in U.S. Appl. No. 13/958,427, 16 pages.
Final Office Action dated May 6, 2016 in U.S. Appl. No. 14/191,329, 17 pages.
Final Office Action dated May 13, 2016 in U.S. Appl. No. 14/390,831, 6 pages.
Final Office Action dated May 20, 2016 in U.S. Appl. No. 14/503,894, 17 pages.
Final Office Action dated Nov. 9, 2016 in U.S. Appl. No. 14/612,089, 11 pages.
Final Office Action dated Nov. 23, 2015 in U.S. Appl. No. 14/668,870, 14 pages.
Final Office Action dated Sep. 6, 2017 in U.S. Appl. No. 14/486,800, 17 pages.
International Search Report and Written Opinion dated Jul. 8, 2013 in International Application No. PCT/CA2013/000292, 9 pages.
International Search Report and Written Opinion dated Jun. 6, 2012 in International Patent Application No. PCT/CA2012/050127, 10 pages.
"Making it Easier to Share With Who You Want," Facebook, Aug. 23, 2011, last updated on Dec. 12, 2012 retrieved from https://wwwlacebook.com/notes/facebook/making-it-easier-to-share-with-who-you-want/10150251867797131/, retrieved on Jun. 1, 2018, 14 pages .
Cheng, B. et al., "SilentSense: Silent User Identification via Dynamics of Touch and Movement Behavioral Biometrics," Cryptography and Security (cs Cr); Human-Computer Interaction, pp. 9, 31 Aug. 2013, 9 pp.
English Translation of Chinese Office Action dated Nov. 3, 2017 in Chinese Application No. 201480002856.0, 12 pages.
English Translation of First Office Action dated Oct. 11, 2017 in Chinese Patent Application No. 20150209998.0, 10 pages.
English Translation of Notification of Reason for Refusal dated Jul. 10, 2014 in Korean patent application No. 10-2014-0027979, 3 pages.
Final Office Action dated Jan. 5, 2018 in U.S. Appl. No. 14/503,894, 16 pages.
Communication pursuant to Article 94(3) EPC dated Feb. 26, 2018 in European Patent Application No. 14785422.8, 7 pages.
Communication pursuant to Article 94(3) EPC dated Mar. 05, 2018 in European Patent Application No. 14794212.2, 5 pages.
Extended European Search Report dated Apr. 16, 2018 in European Application No. 15845310.0, 7 pages.
Extended European Search Report dated Aug. 11, 2016 in European Patent Application No. 14785422.8, 8 pages.
Extended European Search Report dated Aug. 25, 2017 in European Patent Application No. 157 48667.1, 10 pages.
Extended European Search Report dated Jul. 22, 2014 in European Patent Application No. 12755563.9, 5 pages.
Extended European Search Report dated Mar. 16, 2018 in European Patent Application No. 15842839.1, 7 pages.
Extended European Search Report dated Mar. 19, 2018 in European Patent Application No. 15840819.5, 9 pages.
Extended European Search Report dated Mar. 19, 2018 in European Patent Application No. 15843933.1, 8 pages.
Extended European Search Report dated Mar. 27, 2018 in European Patent Application No. 15843989.3, 8 pages.
Extended European Search Report dated May 14, 2018 in European Patent Application No. 15847469.2, 11 pages.
Final Office Action dated Feb. 9, 2016 in U.S. Patent Appl. No. 14/486,800, 14 pages.
Final Office Action dated Feb. 26, 2016 in U.S. Appl. No. 14/492,604, 16 pages.
Non-Final Office Action dated Sep. 9, 2016 in U.S. Appl. No. 13/887,711, 24 pages.

(56) References Cited

OTHER PUBLICATIONS

Non-Final Office Action dated Sep. 29, 2016 in U.S. Appl. No. 14/834,434, 12 pages.
Pedro, L et al., "Augmenting touch interaction through acoustic sensing", Proceedings of the ACM International 3onference on Interactive Tabletops and Surfaces, pp. 53-56, Nov. 13-16, 2011.
Sarah, M. K. et al., "A Personal Touch—Recognizing Users Based on Touch Screen Behavior," PhoneSense'12, Nov. 6, 2012, Toronto, ON, Canada, 6 Nov. 2012, 5 pages.
"Swype Advanced Tips", [http://www.swype.com/tips/advanced-tips], Jun. 25, 2014, retrieved via the Wayback Machine on Jun. 29, 2018, [https:web.archive.Org/web/20140625073212/http://www.swype.com/tips/advanced-tips], 2 pages.
"Swype Basics", [http://www.swype.com/tips/swype-basics], retrieved via the Wayback Machine dated Jun. 14, 2014,—retrieved via the Wayback Machine on Jun. 29, 2018, [https:web.archive.org/ web/20140614200707/http://www.swype. mm/tips/swype-basics, 2 pages.
"Swype Tips", [http://www.swype.com/category/tips], Jul. 2, 2014, retrieved via the Wayback Machine on Jun. 29, 2018, [https:web.archive.Org/web/20140702102357/http://www.swype.com/ category/tips, 2 pages.
Non-Final Office Action dated Apr. 15, 2015 in U.S. Appl. No. 13/856,414, 17 pages.
Non-Final Office Action dated Apr. 16, 2018 in U.S. Appl. No. 13/958,427, 14 pages.
Non-Final Office Action dated Apr. 26, 2018 in U.S. Appl. No. 14/495,041, 15 pages.
Non-Final Office Action dated Dec. 20, 2017 in U.S. Appl. No. 14/834,434, 12 pages.
Non-Final Office Action dated Jul. 8, 2015 in U.S. Appl. No. 14/191,329, 18 pages.
Non-Final Office Action dated Jul. 11, 2017 in U.S. Appl. No. 14/390,831, 79 pages.
Non-Final Office Action dated Jul. 17, 2017 in U.S. Appl. No. 15/073,407, 8 pages.
Non-Final Office Action dated Jun. 9, 2016 in U.S. Appl. No. 14/612,089, 11 pages.
Non-Final Office Action dated May 7, 2018 in U.S. Appl. No. 14/191,329, 17 pages.
Non-Final Office Action dated May 9, 2018 in U.S. Appl. No. 13/887,711, 27 pages.
Non-Final Office Action dated Nov. 15, 2017 in U.S. Appl. No. 15/198,062, 24 pages.
Non-Final Office Action dated Nov. 24, 2015 in U.S. Appl. No. 14/191,329, 31 pages.
Non-Final Office Action dated Oct. 8, 2015 in U.S. Appl. No. 13/958,427, 15 pages.
Non-Final Office Action dated Oct. 18, 2017 in U.S. Appl. No. 15/406,770, 12 pages.
Non-Final Office Action dated Oct. 19, 2015 in U.S. Appl. No. 14/668,870, 6 pages.
Non-Final Office Action dated Oct. 23, 2014 in U.S. Appl. No. 14/275,124, 10 pages.
Non-Final Office Action dated Oct. 25, 2013 in U.S. Appl. No. 13/410,956, 8 pages.
Non-Final Office Action dated Oct. 28, 2015 in U.S. Appl. No. 14/390,831, 22 pages.
Non-Final Office Action dated Sep. 8, 2016 in U.S. Appl. No. 14/492,604, 14 pages.
Notice of Allowance dated Jan. 26, 2015 in U.S. Appl. No. 13/849,698, 27 pages.
Notice of Allowance dated Dec. 6, 2016 in U.S. Appl.No. 14/751,589, 27 pages.
Non-Final Office Action dated Jul. 30, 2018 in U.S. Appl. No. 15/406,770, 20 pages.
Notice of Allowance dated Feb. 2, 2015 in U.S. Appl. No. 13/780,494, 43 pages.
Non-Final Office Action dated Jun. 26, 2018 in U.S. Appl. No. 14/486,800, 25 pages.
Final Office Action dated Aug. 8, 2018 in U.S. Appl. No. 14/834,434, 19 pages.
Non-Final Office Action dated Sep. 2, 2014 in U.S. Appl. No. 13/863,193, 41 pages.
Final Office Action dated Mar. 4, 2015 in U.S. Appl. No. 13/863,193, 50 pages.
Non-Final Office Action dated Jan. 7, 2016 in U.S. Appl. No. 13/863,193, 58 pages.
Final Office Action dated Sep. 15, 2016 in U.S. Appl. No. 13/863,193, 50 pages.
Non-Final Office Action dated Apr. 6, 2017 in U.S. Appl. No. 13/863,193, 70 pages.
Final Office Action dated Jan. 9, 2018 in U.S. Appl. No. 13/863,193, 50 pages.
Notice of Allowance dated May 22, 2018 in U.S. Appl. No. 13/863,193, 73 pages.
Notice of Allowance dated Sep. 1, 2016 in U.S. Appl. No. 13/856,414, 28 pages.
Chinese Office Action for Chinese Patent Application No. 201510240522.3 dated Jun. 28,2018, 30 pages. (including English Translation).
Final Office Action received for U.S. Appl. No. 15/075,648 dated Dec. 21, 2018, 13 pages.
Non-Final Office Action received for U.S. Appl. No. 15/815,679 dated Sep. 28, 2018, 69 pages.
Final Office Action received for U.S. Appl. No. 15/198,062 dated Sep. 6, 2018, 32 pages.
Non-Final Office Action received for U.S. Appl. No. 16/126,175 dated Nov. 1, 2018, 86 pages.
Communication pursuant to Article 94(3) EPC for European Patent Application No. 15845310.0 dated Jan. 3, 2019, 4 pages.
Chinese First Office Action received for Chinese Patent Application No. 201510240372.6 dated Sep. 27, 2018, 18 pages. (including English Translation).
Chinese Second Office Action received for Chinese Patent Application No. 201510240372.6 dated May 15, 2019, 16 pages. (including English Translation).
Chinese Search Report received for Chinese Patent Application No. 201580053216.7, dated Apr. 16, 2019, 2 pages.
European Search Report received for European Patent Application No. 16839786.7, dated Feb. 12, 2019, 8 pages.
Communication pursuant to Rules 70(2) and 70a(2) EPC received for European Patent Application No. 16839786.7 dated Mar. 1, 2019, 1 page.
European Search Report received for European Patent Application No. 16818725.0, dated Dec. 21,2018, 8 pages.
Communication pursuant to Rules 70(2) and 70a(2) EPC received for European Patent Application No. 16818725.0 dated Jan. 8, 2019, 1 page.
Third Office Action received for Canadian Patent Application No. 2869699, dated Jan. 9, 2017, 3 pages.
First Examination report received for Australian Patent Application No. 2012225130, dated Feb. 9, 2015, 4 pages.
First Office Action received for Canadian Patent Application No. 2802746, dated Apr. 9, 2013, 3 pages.
Final Office Action received for U.S. Appl. No. 15/075,648 dated May 31, 2019, 17 pages.
Non-Final Office Action received for U.S. Appl. No. 15/836,798 dated Jul. 5, 2019, 95 pages.
Final Office Action received for U.S. Appl. No. 14/684,407 dated Jun. 10, 2019, 26 pages.
Non-Final Office Action received for U.S. Appl. No. 14/191,329 dated Jul. 16, 2019, 30 pages.
Chinese First Office Action received for Chinese Patent Application No. 201580051873.8 dated Jun. 21,2019, 15 pages (Including English Translation).
Final Office Action received for U.S. Appl. No. 13/887,711 dated Jul. 25, 2019, 24 pages.
Final Office Action received for U.S. Appl. No. 14/684,407 dated Sep. 20, 2019, 26 pages.
Final Office Action received for U.S. Appl. No. 14/495,041 dated Aug. 9, 2019, 26 pages.

(56) References Cited

OTHER PUBLICATIONS

Non-Final Office Action received for U.S. Appl. No. 14/834,434 dated Aug. 5, 2019, 19 pages.
Final Office Action received for U.S. Appl. No. 16/126,175 dated Aug. 2, 2019, 161 pages.
Final Office Action dated Mar. 7, 2018 in U.S. Appl. No. 14/219,919, 21 pages.
Non-Final Office Action dated Jul. 19, 2017 in U.S. Appl. No. 14/219,919, 20 pages.
Notice of Allowance issued in U.S. Appl.No. 16/404,694, dated Dec. 3, 2020, 8 pages.
Chinese Office Action for Chinese Patent Application No. 201280062500.7 dated Apr. 17, 2017, 15 pages (including English Translation).

\* cited by examiner

METHOD AND APPARATUS FOR CLASSIFYING A TOUCH EVENT ON A TOUCHSCREEN AS RELATED TO ONE OF MULTIPLE FUNCTION GENERATING INTERACTION LAYERS

CROSS-REFERENCE TO RELATED APPLICATION

This application is a continuation of application Ser. No. 14/751,589 filed on Jun. 26, 2015 having the title "METHOD AND APPARATUS FOR CLASSIFYING A TOUCH EVENT ON A TOUCH SCREEN AS RELATED TO ONE OF MULTIPLE FUNCTION GENERATING INTERACTION LAYERS AND ACTIVATING A FUNCTION IN THE SELECTED INTERACTION LAYER," which is a continuation-in-part of application Ser. No. 14/612,089 filed on Feb. 2, 2015 having the title "METHOD AND APPARATUS FOR CLASSIFYING FINGER TOUCH EVENTS ON A TOUCH SCREEN," which is in turn a continuation of U.S. Pat. No. 9,013,452 filed on Mar. 25, 2013 having the title "METHOD AND SYSTEM FOR ACTIVATING DIFFERENT INTERACTIVE FUNCTIONS USING DIFFERENT TYPES OF FINGER CONTACTS."

TECHNICAL FIELD

The present invention relates to classifying touch events, and more particularly, to a method and system for classifying touch event and vibro-acoustic signals to identify a finger part used to touch an interactive element displayed on a touch screen and treating the touch event so classified as meant to activate a function or functions in a traditional application layer, a gestures layer or an auxiliary action layer.

BACKGROUND

Contemporary interactive surfaces generally treat finger touches as a single class of input. However, this is a gross simplification-fingers are diverse appendages, both in their motor capabilities and their anatomical composition. Supporting additional dimensions of finger input have largely been ignored because instrumenting the user with active or passive components is invasive.

At present, in order for a finger to perform different operations at a single point in space on a touch screen, it must be overloaded (e.g., in time or space). Most common is a tap-and-hold period, or chording of the fingers (e.g., two-finger-tap for right click). This can trigger a transient contextual menu, which allows a user to select one of several actions. An alternative to finger overloading is breaking function out into one or more buttons. For example, there is a scheme in which one button is for minimizing a window and another button is for closing it. However, this is problematic for mobile devices with limited screen real estate.

Currently, touch screens do not distinguish between different types of finger contacts. For example, touching with the tip of the finger and touching with the knuckle are treated the same. As such, all finger touches have the same interactive outcome. Also, currently, touch screen interfaces generally pass input events (e.g. finger touches) directly through to running applications. For example, a finger press on an application icon that is visible on the touch screen launches it. As such, all finger touches have interactions with only one interaction layer, for example, with the layer of running application(s) that has (have) software buttons or other widgets, or icons that are visible on the touch screen.

SUMMARY

In view of the above, embodiments of the present invention provide a method and system for activating functions in different interactive layers based on a classification of vibro-acoustic and touch signals. In accordance with an aspect of the present invention, there is provided a system for classifying touch events, the system comprises a touch screen configured to display an interactive element; one or more vibro-acoustic sensors (i.e., mechanical vibrations and/or sound) operating inside a computing device (e.g., coupled to the touch screen, chassis, mainboard PCB, daughterboard, etc.); a touch event detector configured to monitor user touch events and capture associated data; one or more vibro-acoustic sensors and to capture, save and/or buffer vibro-acoustic signals sensed; wherein the touch event detector is further configured to detect touch events in which the interactive element is touched by a first or a second finger part of a user, and wherein the touch events result in generating the vibro-acoustic and touch signals; and a classifier configured to classify the vibro-acoustic and touch signals. Such classification is then used to treat touch events as related to different function generating interaction layers depending on which finger part was used to create the touch event. For example, the fingertip or finger pad may be used to activate functions in a traditional application layer to launch an application or drag an icon, while the knuckle or nail may be used to access an entirely separate function generating layer such as functions triggered by gestures. In this example, the gestures layer may not have visible icons on the touch screen. For example, a "C" gesture made on the touch screen by a user by using his/her knuckle or fingernail would launch a camera application and not at all affect the running application (e.g. email) that is visible on the touch screen.

BRIEF DESCRIPTION OF THE DRAWINGS

The above and other objects and features of the present invention will become apparent from the following description of an exemplary embodiment given in conjunction with the accompanying drawings, in which like reference numerals are used to refer to like elements throughout, and in which.

DETAILED DESCRIPTION

The advantages and features of exemplary embodiments and methods of accomplishing these will be clearly understood from the following embodiments taken in conjunction with the accompanying drawings. However, the exemplary embodiments are not limited and may be implemented in various forms. It should be noted that the exemplary embodiments are provided to make a full disclosure and also to allow those skilled in the art to understand the full range of the exemplary embodiments. Therefore, the exemplary embodiments are to be defined only by the scope of the appended claims.

FIGS. 1A to 4B are exemplary diagrams illustrating a concept of activating different interactive functions based on a classification of touch and vibro-acoustic signals in accordance with an exemplary embodiment of the present invention;

In brief, a concept of the present invention may be described as follow. A user touches or contacts a touch screen with one of the finger parts, e.g., a fingertip. Such a touch event triggers a primary or conventional functionality, such as opening a file, dragging a file, launching an application, selecting a song, pressing a button, and the like. When a user touches the touch screen with another one of the finger parts, e.g., a knuckle or fingernail, an auxiliary function is launched on the same touch screen.

Although one or more exemplary embodiments explain and illustrate that a fingertip causes to activate a primary function and a knuckle or fingernail causes to activate an auxiliary function, the embodiments do not limit thereto. It should be noted that different combination of these finger parts or the use of other finger parts can also activate the primary and auxiliary functions.

Figure 1A:
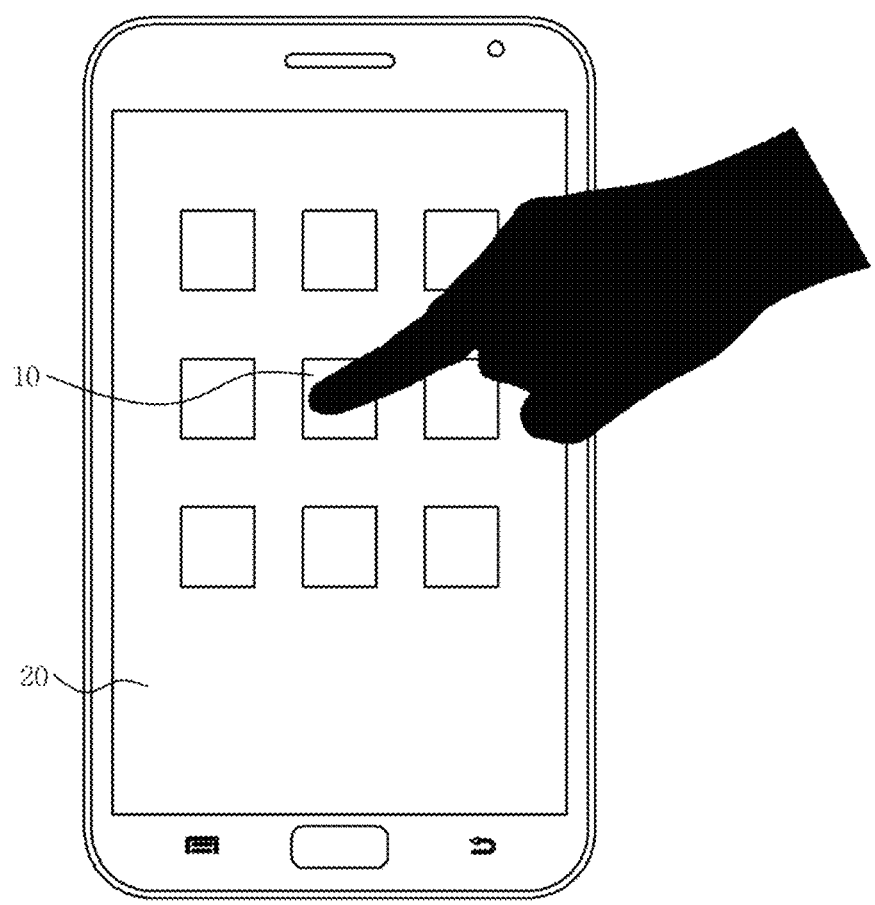
FIGS. 1A to 4B are exemplary diagrams illustrating a concept of activating different interactive functions based on a classification of touch and vibro-acoustic signals in accordance with an exemplary embodiment of the present invention.

First, FIG. 1A illustrates one exemplary diagram that a fingertip is used to trigger a primary or conventional function.

As shown in FIG. 1A, when a user touches an interactive element 10 on a touch screen 20 with a fingertip, a primary or conventional function is triggered. The term of "interactive element" used herein may refer to a user interface such as an icon or a graphical object representing applications or services designed to activate a specific function related thereto. The specific function, for example, may include such actions opening, dragging, launching, selecting, or pressing a photo, a file, a text, an image, an application, a song, a button, a game, an in-game character or the like through the use of the applications or services.

Figure 1B:
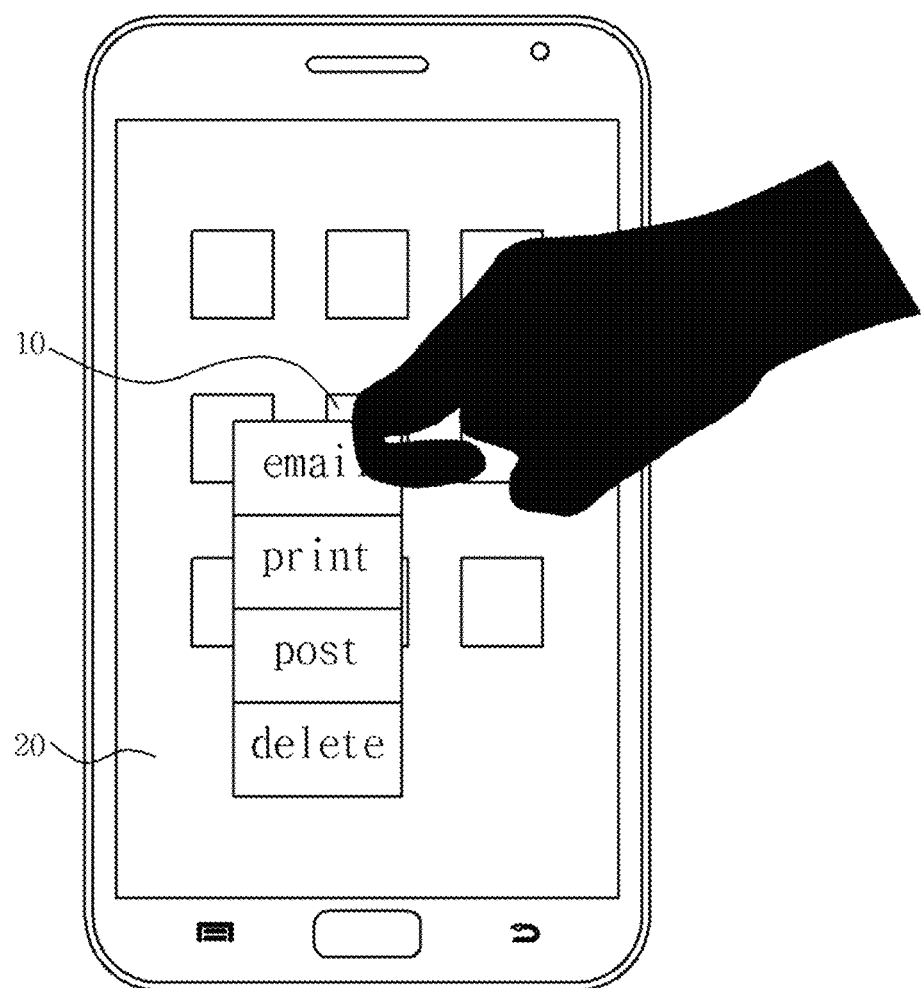
Figure 1C:
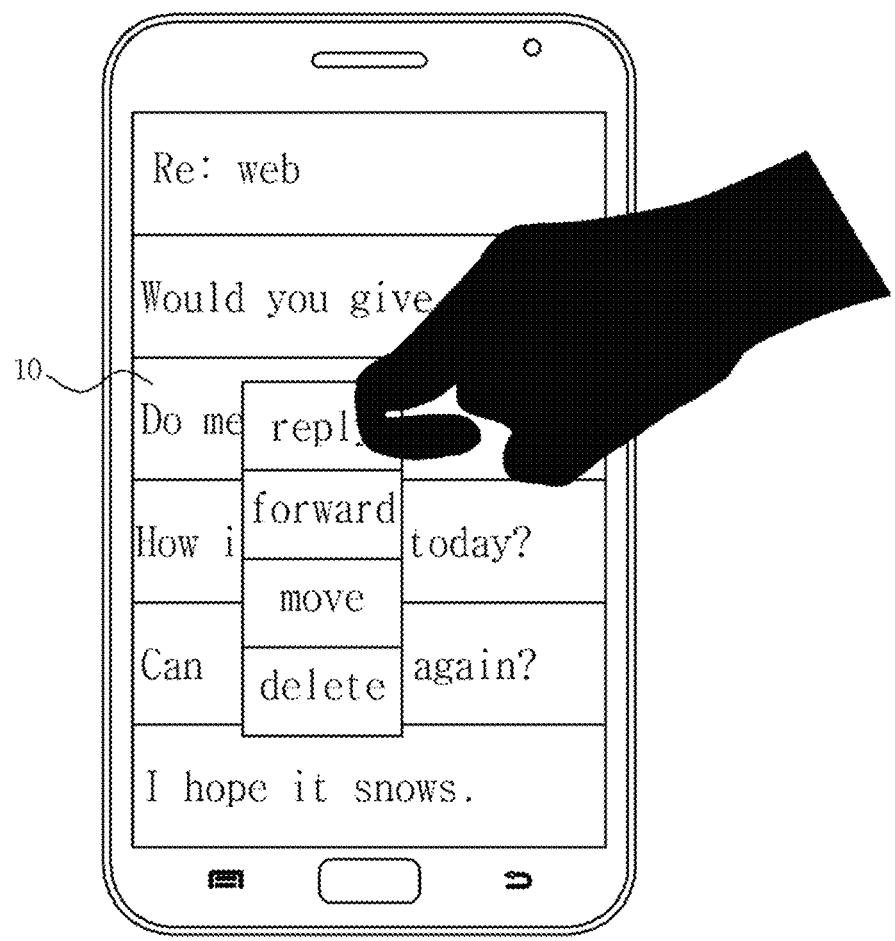

FIGS. 1B and 1C illustrate exemplary diagrams that a knuckle or fingernail is used to activate an auxiliary function such as a pop-up of context menus.

Referring to FIG. 1B, a fingertip may be used to scroll (i.e., translate a display window) as seen in contemporary touch interfaces. When a knuckle or fingernail touches an interactive element 10 on a touch screen 20, e.g., a photo, a contextual pop-up menu could appear with the following options: email, print, post, delete and the like. As another example, as shown in FIG. 1C, when a knuckle or fingernail touches an interactive element 10, e.g., an opened email, a context menu could appear with the following options: reply, forward, move, delete, and the like.

Figure 2A:
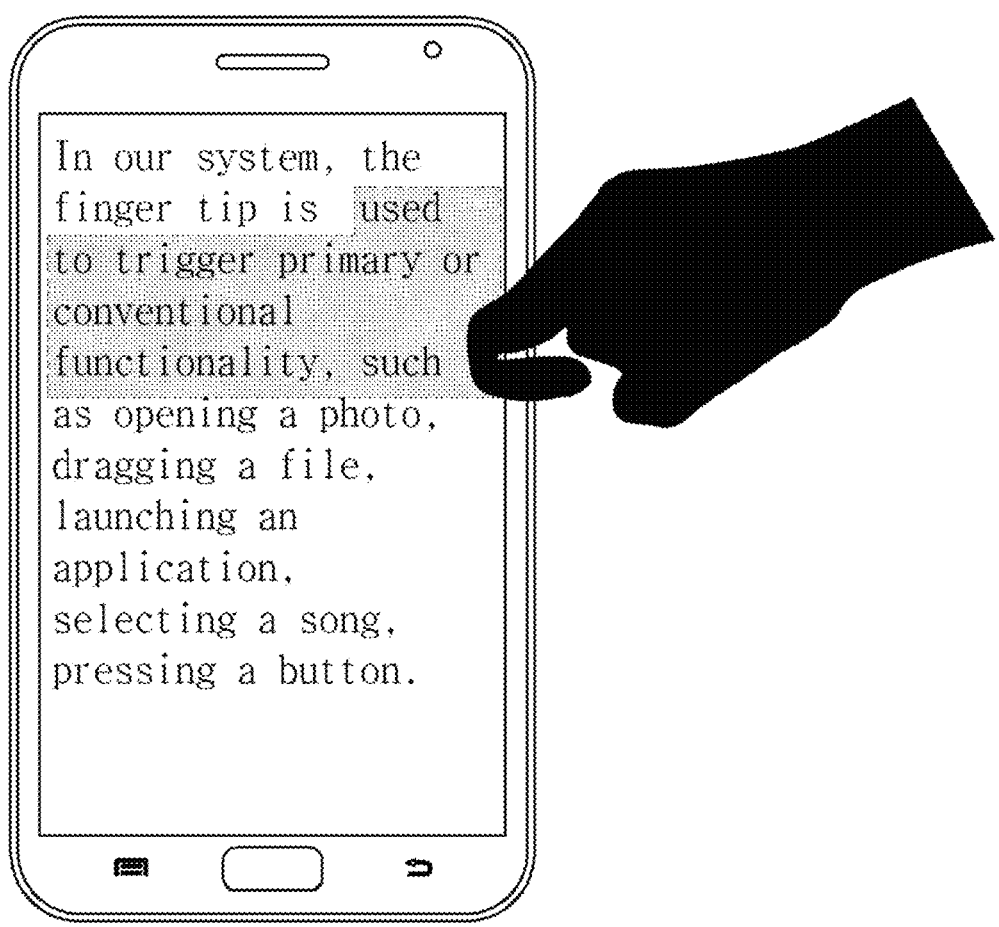
Figure 2B:
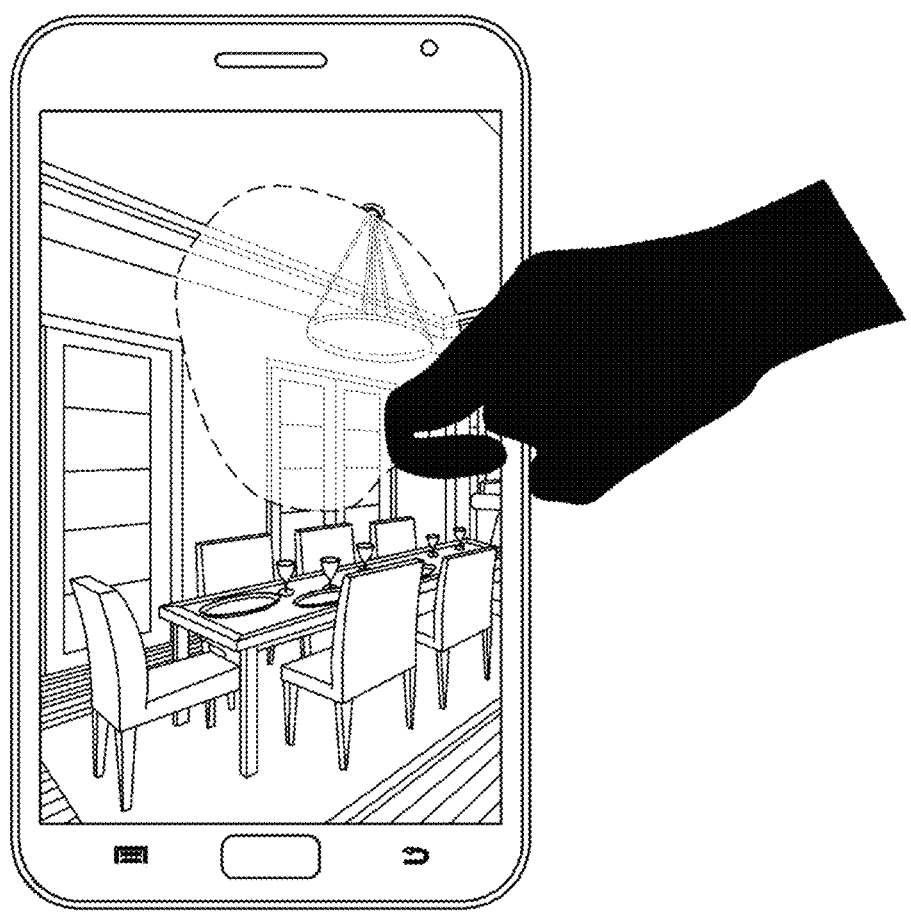
Figure 2C:
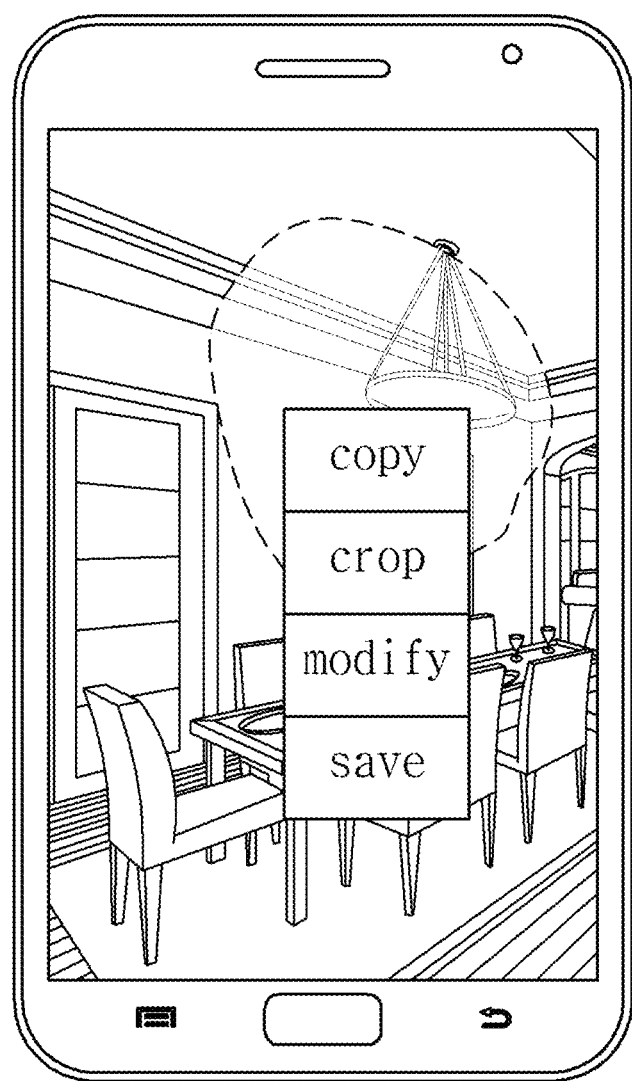

FIGS. 2A, 2B and 2C illustrate exemplary diagrams that the knuckle or fingernail can be used for interactions requiring selection.

In FIG. 2A, one exemplary embodiment includes a selection of text. A fingertip may be used to scroll (i.e., translate a display window) as seen in contemporary touch interfaces. Using a knuckle or fingernail, a user may touch and drag over a region of text to select the text. As another example, using a knuckle or fingernail, a user may touch and drag over a region of text to paint the text in a special color (e.g., a highlighting tool).

In FIG. 2B, using a knuckle or fingernail, a user may touch and drag over a region of an image to lasso select an arbitrary shaped sub-region of the image or a user may touch and drag over a region of an image to select a rectangular sub-region of the image. Finally, upon completion of this selection action, a context menu could automatically appear. For example, as illustrated in FIG. 2C, following an image region selection, a context menu could appear with the following options: copy, crop, modify, save, etc. As another example, following a text selection, a context menu could appear with the following options: copy, cut, paste, search, delete, etc.

Figure 3A:
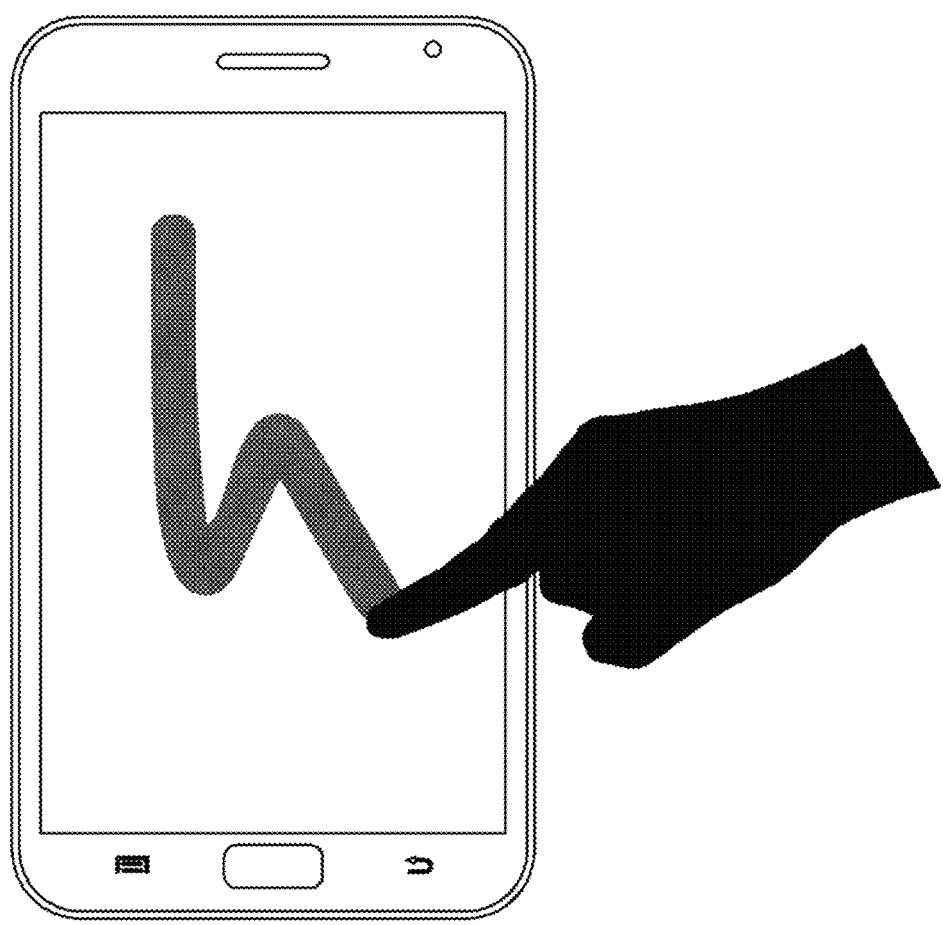
Figure 3B:
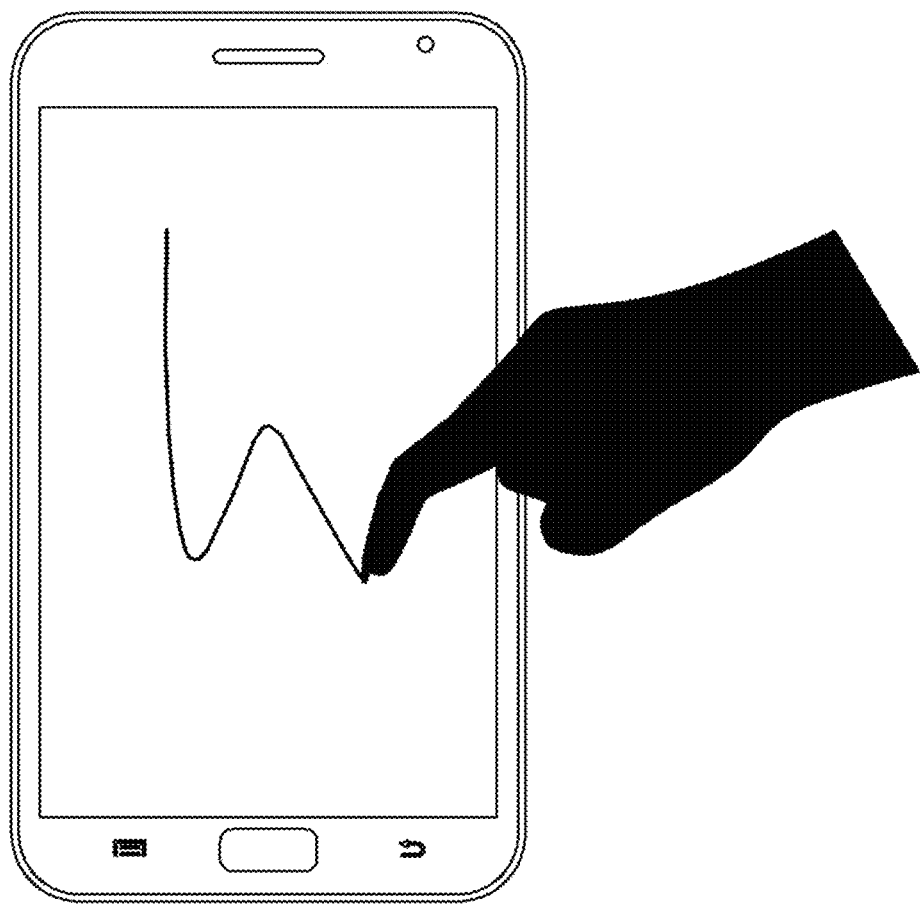
Figure 3C:
Figure 3D:
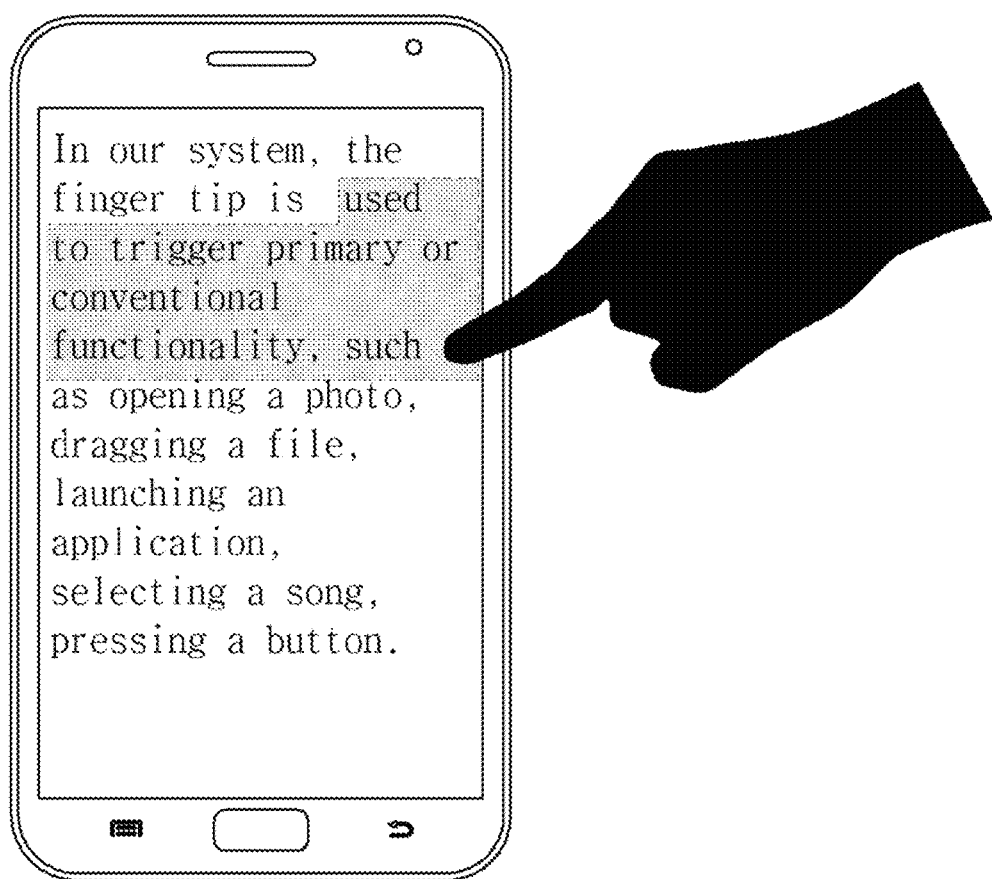
Figure 3E:
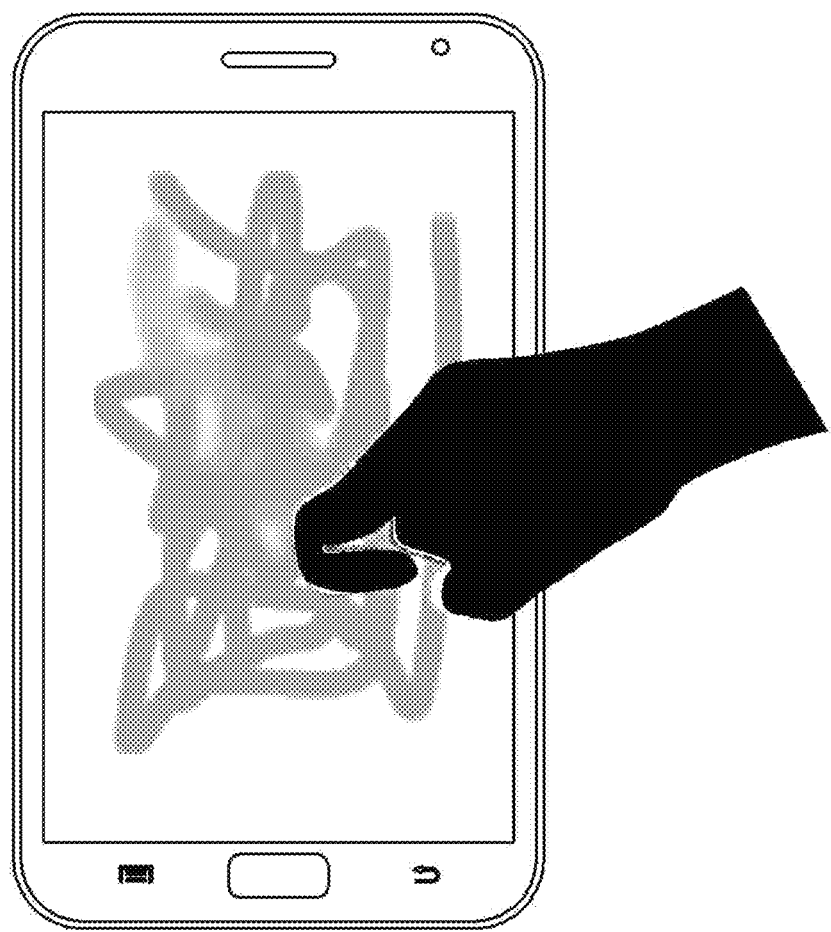

FIGS. 3A to 3E illustrate exemplary diagrams in which touches with the finger tip, knuckle and fingernail are used for different drawing actions in a drawing mode. In exemplary embodiment, the finger parts of the user are used as tools for different drawing actions in the drawing mode. For example, the fingertip may be used as a thick brush, the fingernail or knuckle as a fine marker, and the knuckle for erasing, as illustrated in FIGS. 3A, 3B, and 3C, respectively. Another exemplary configuration includes using the fingertip as a marker for highlighting the selected text region and the knuckle for smudging, as illustrated in FIGS. 3D and 3E, respectively.

Figure 4A:
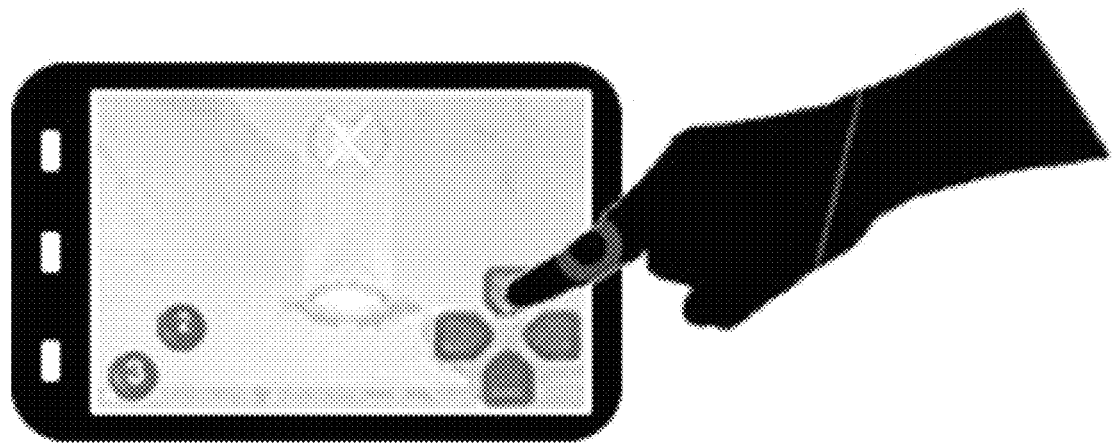
Figure 4B:
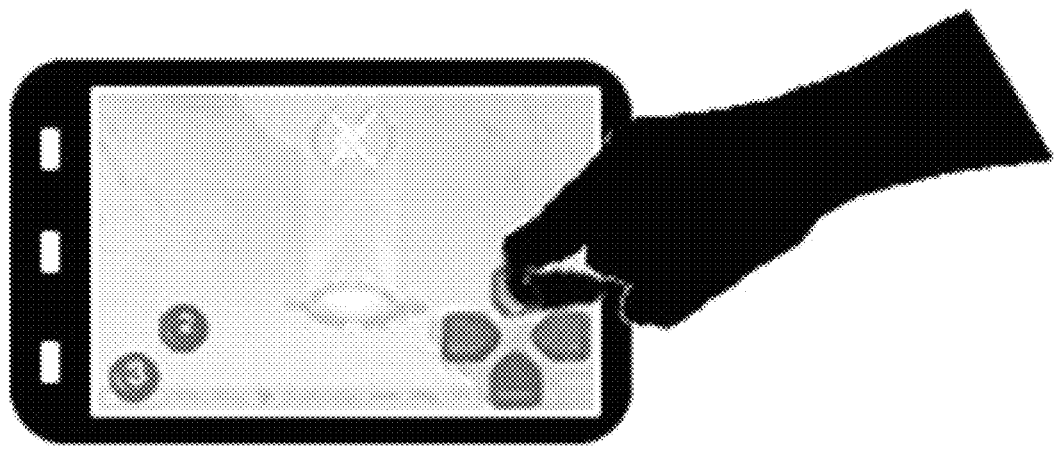

FIGS. 4A and 4B illustrate exemplary diagrams that the touches with the knuckle and fingernail can be used for auxiliary actions in games in concert with fingertip driven interactions.

As illustrated in FIG. 4A, using an onscreen movement control (e.g., virtual joy stick or arrow pad), a fingertip may be used for regular in-game character (i.e., player) movement. If a knuckle or fingernail is used, as illustrated in FIG. 4B, the directional player movement may be performed in a crouched position. As another example, a fingertip may be used for a primary weapon fire and a knuckle or fingernail for alternative weapon mode. Also, a touch with a fingernail may be used to run. In addition, a momentary tap of the knuckle or fingernail (i.e., a tap) may be used to jump an in-game character.

Figure 5:
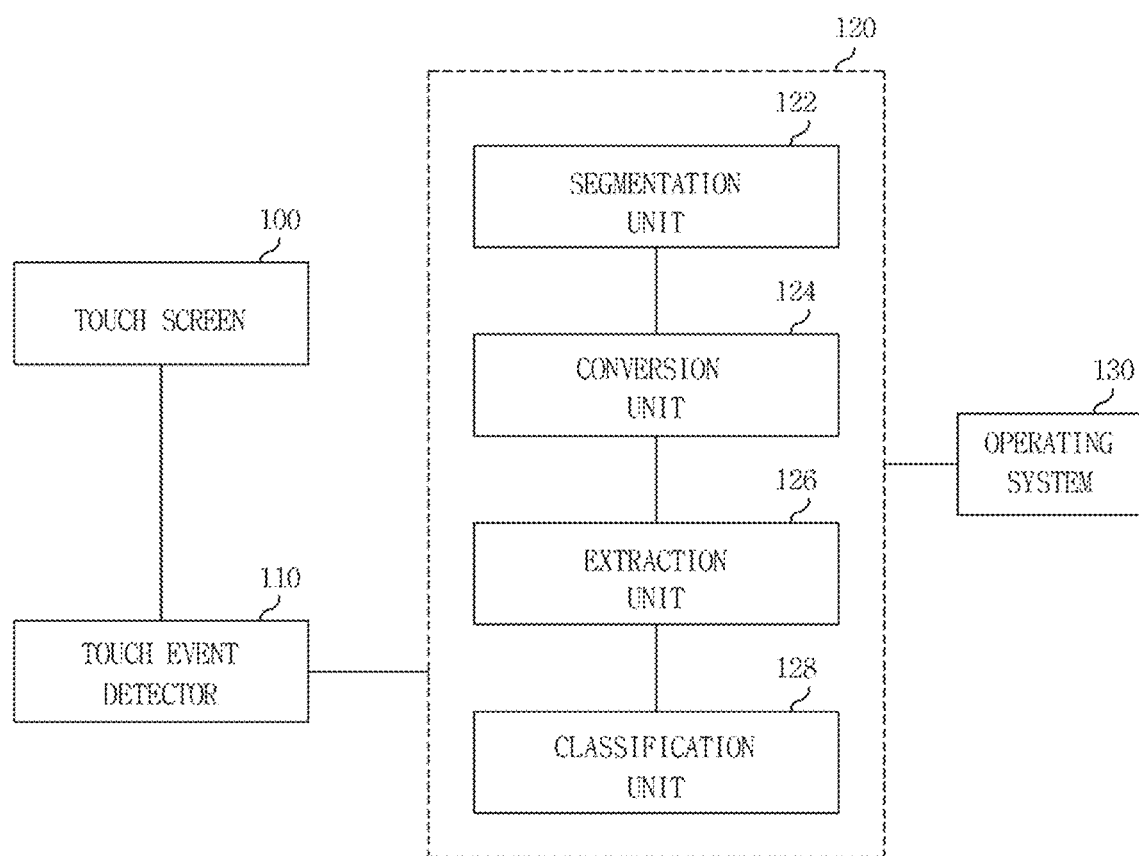
FIG. 5 is a block diagram of a computing system for activating different interactive functions based on a classification of touch and vibro-acoustic signals in accordance with an exemplary embodiment of the present invention.

FIG. 5 is a block diagram of a computing system for distinguishing different interactive functions based on a classification of touch and vibro-acoustic signals in accordance with an embodiment of the present invention.

The computing system of the embodiment may have an operating system (OS), and can run various types of services or applications, known as apps. The computing system may also be equipped with a telecommunication capability that can allow connections to communication network. Such a computing system may include, but not limited to, a table top computer (e.g., Surface Computing), laptop computer, desktop computer, mobile computer, mobile internet device, mobile phone, smart-phone, PDA (Personal Digital Assistant), game console, portable media player, and the like.

Referring to FIG. 5, the computing system includes a touch screen 100, a touch event detector 110, a touch and vibro-acoustic classifier 120, and an OS 130.

Figure 6:
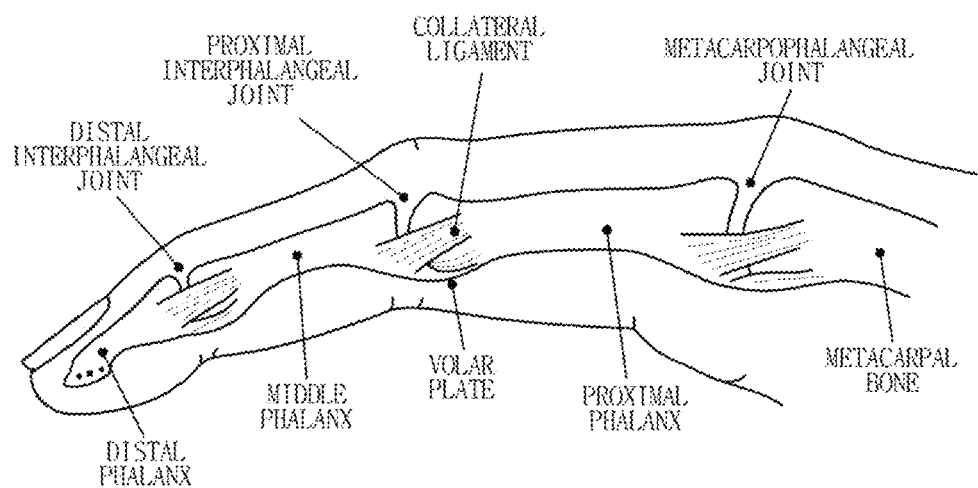
FIG. 6 illustrates an anatomical chart of finger parts for use in interacting with the computing system in accordance with an exemplary embodiment of the present invention.

The touch screen 100 is an electronic visual display and serves also an input/output device supplementing or substituted for a keyboard, a mouse, and/or other types of devices. The touch screen 100 displays one or more interactive elements such as graphical representation for services or applications designed to perform a specific function on the computing system. Touching the interactive elements with the finger parts of a user, beyond the conventional tip of the finger, causes the OS 130 to activate the application or service related to the interactive elements. As shown in FIG. 6, fingers are diverse appendages, both in their motor capabilities and their anatomical compositions. A single digit contains different parts such as one or more knuckles, a tip, pad, and fingernail.

The fingertip includes the fleshy mass on the palmar aspect of the extremity of the finger, as well as the finger sides up to the distal interphalangeal articulation. It also includes the very tip of the finger (i.e., the distal tip of the distal phalanx). However, the fingernail may not be included in an embodiment as part of fingertip definition, as this is an anatomically distinct feature and region.

The fingernail encompasses all parts of the keratin (or artificial nail material), horn-like envelope covering the dorsal aspect of the terminal phalanges of fingers. The knuckle includes the immediate areas surrounding the boney joints of human fingers, including joints on the thumb, and both major and minor knuckles. Specifically, the boney regions are within a 1 cm radius surrounding the metacarpophalangeal joints and interphalangeal articulations.

Figure 7:
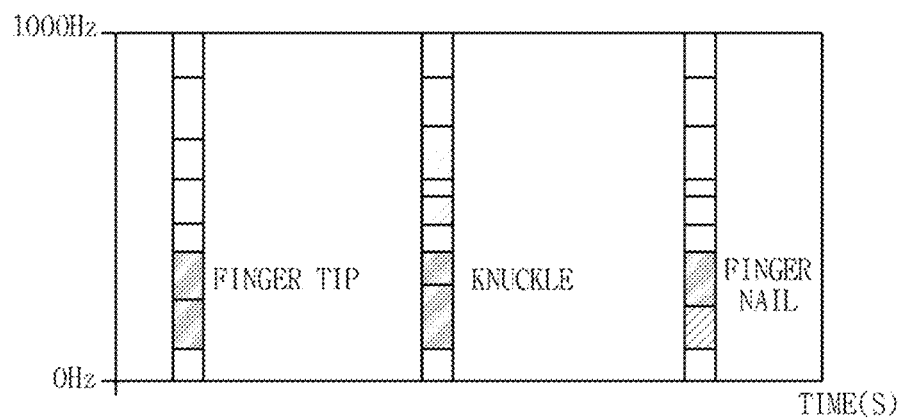
FIG. 7 shows a spectrogram of finger parts in accordance with an exemplary embodiment of the present invention.

When an object strikes a certain material, vibro-acoustic waves propagate outward through the material or along the surface of the material. Typically, interactive surfaces use rigid materials, such as plastic or glass, which both quickly distribute and faithfully preserve the signal. As such, when respective finger parts touch or contact the surface of the touch screen 100, vibro-acoustic responses are produced. The vibro-acoustic characteristics of the respective finger parts are unique, mirroring their unique anatomical compositions. For example, FIG. 7 illustrates a spectrogram of three types of the finger contact. As known from FIG. 7, the finger parts, that is, a fingertip, a knuckle, and a fingernail, produce different vibro-acoustic responses.

When a user wants to use an application or a service on the computing system, the user may touch an interactive element for the application or service with a finger part such as a fingertip, knuckle, or fingernail. Such a touch event results in the generation of a unique vibro-acoustic signal from the surface of the touch screen 100.

Referring back to FIG. 5, the touch event detector 110 detects the touch event entailing the vibro-acoustic signal. The touch event detector 110, for example, may be arranged at a rear side of the touch screen so that the vibro-acoustic signal caused by the touch event can be captured. The touch event detector 110 can be triggered by the onset of the vibro-acoustic signal resulting from the touch event. To capture the touch event and subsequent vibro-acoustic signal, the touch event detector 110 may include one or more impact sensors, vibration sensors, accelerometers, strain gauges, or acoustic sensors such as a condenser microphone, a piezoelectric microphone, MEMS microphone and the like. Once the vibro-acoustic signal has been captured by the touch event detector 110, the vibro-acoustic classifier 120 processes the vibro-acoustic signal to distinguish which finger part was used.

The OS 130 runs the computing system so that the primary function or the auxiliary function can be activated in line with the classification of the vibro-acoustic signals.

The vibro-acoustic classifier 120 includes a segmentation unit 122 to segment the vibro-acoustic signal into a digital representation; a conversion unit 124 to convert the digitized vibro-acoustic signal into an electrical signal; a feature extraction unit 126 derive a series of features from the electrical signal; and a classification unit 128 to classify the finger part using the features to distinguish what finger part was used for the touch event.

The segmentation unit 122 samples the vibro-acoustic signal, for example, at a sampling rate of 96 kHz, using a sliding window of 4096 samples of the vibro-acoustic signal. The conversion unit 124 then performs, for example, a Fourier Transform on sampled time-dependent vibro-acoustic signal to produce an electrical signal having frequency domain representation. For example, the Fourier Transform of this window may produce 2048 bands of frequency power.

The vibro-acoustic classifier 120 may further down-sample this data into additional vectors (i.e., buckets of ten), providing a different aliasing. In addition, additional time-domain features may be calculated from the vibro-acoustic signal, such as the average absolute amplitude, total absolute amplitude, standard deviation of the absolute amplitude, the center of mass for both the segmented input signal and the Fourier Transformed signal, and zero crossings.

The feature extraction unit 126 may also calculate a series of features from the frequency domain representation of the vibro-acoustic signals, such as the fundamental frequency of the impact waveform.

The classification unit 128 classifies the vibro-acoustic signal using the features to distinguish what finger part was used to generate the touch event, so that the computing system to selectively activate a primary function or an auxiliary function related to the interactive element depending on the classified vibro-acoustic signals.

To aid classification, the user can provide supplemental training samples to the vibro-acoustic classifier 120.

In one exemplary embodiment, the classification unit 128 may be implemented with a support vector machine (SVM) for feature classification. The SVM is a supervised learning model with associated learning algorithms that analyze data and recognize patterns, used for classification and regression analysis.

Various other apparatus, features and methods for carrying out such processing and classification, are disclosed in other pending applications of the assignee hereof. By way of example, U.S. patent application Ser. No. 14/191,329 entitled "Using Capacitive Images for Touch Type Classification" filed on Feb. 26, 2014, is one such prior application the content of which is hereby incorporated by reference as if fully set forth hereon.

Figure 8:
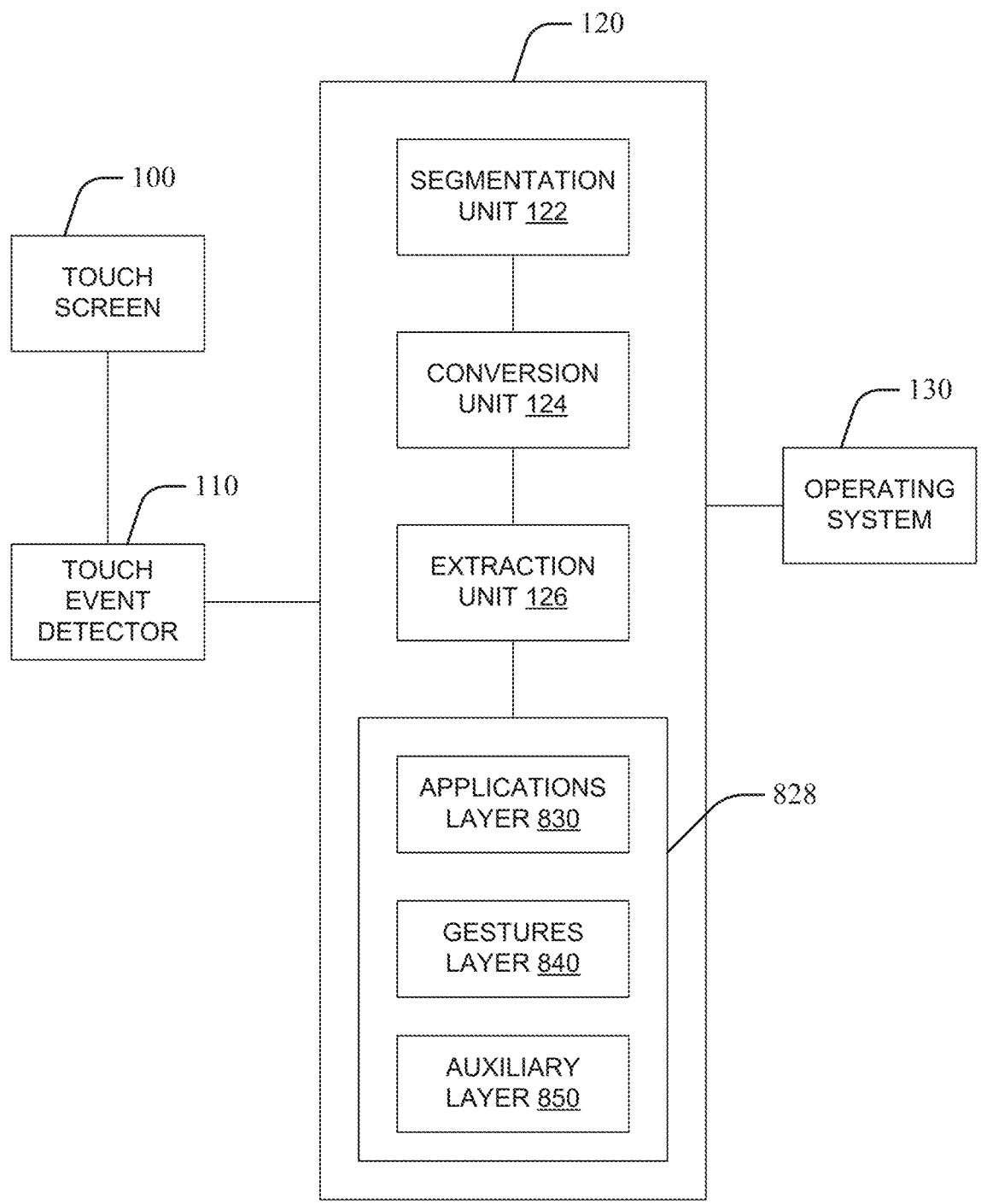
FIG. 8 is a block diagram of a computing system for identifying an interaction layer and activating one or more interactive functions in that layer based on a classification of touch and vibro-acoustic signals in accordance with an exemplary embodiment of the present invention.

FIG. 8 illustrates a block diagram of a computing system for identifying a function generating interaction layer and activating one or more interactive functions in that layer based on a classification of vibro-acoustic signals, in accordance with an exemplary embodiment of the present invention. The computing system of FIG. 8 uses many of the same components that are used by the computing system of FIG. 5. The computing system of FIG. 8 includes a classification unit 828 that includes three components, namely the applications layer component 830, the gestures layer component 840 and the auxiliary layer component 850. The classification unit 828 classifies the touch event and the vibro-acoustic signal generated by a user's contact with the touch screen 100, by using the features generated by the feature extraction unit 126, as related to one of the function generating interaction layers components 830, 840 or 850. The selected component 830, 840 or 850 then facilitates the execution of the one or more functions associated with the touch event.

Figure 9:
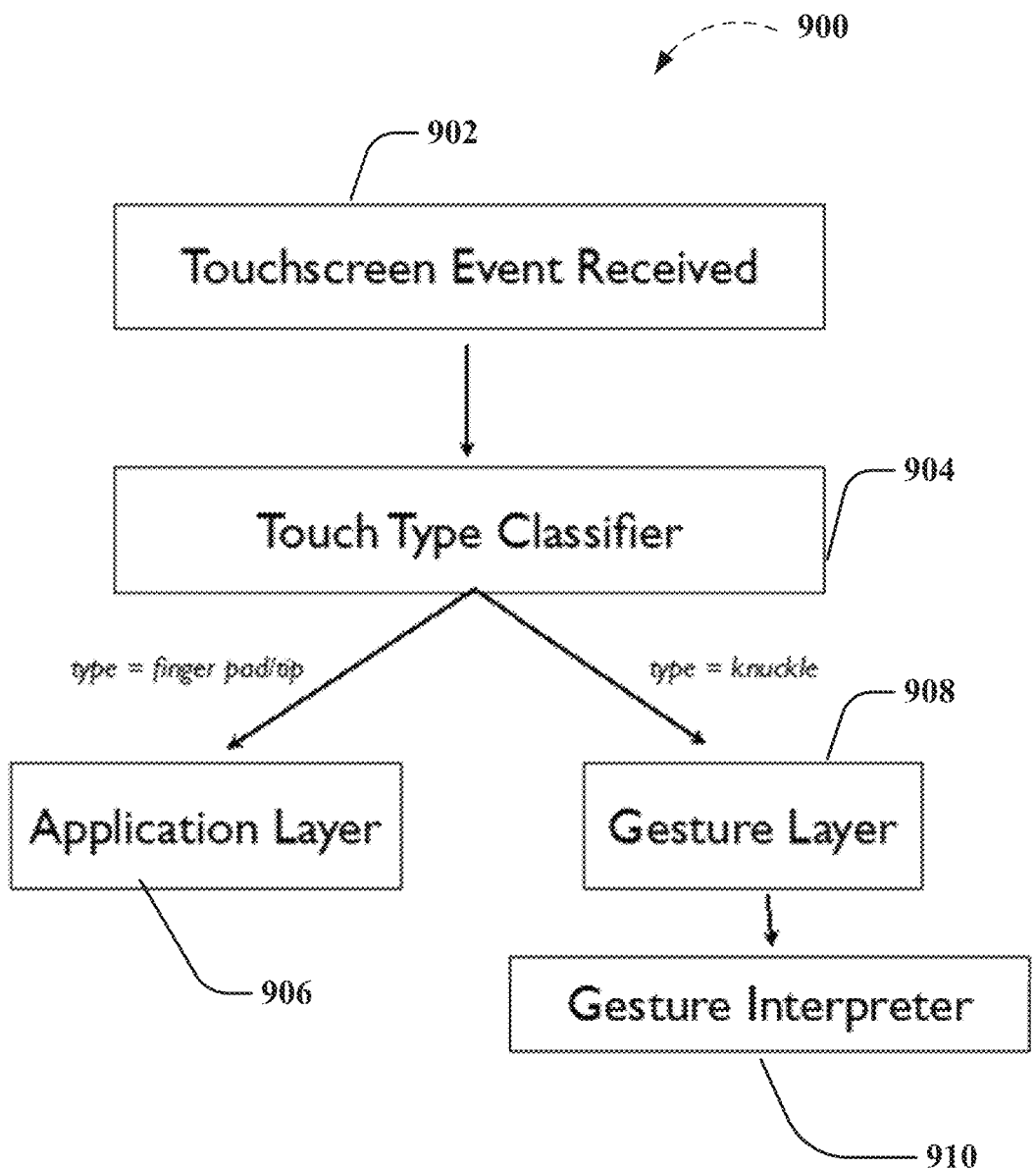
FIG. 9 illustrates an exemplary flow diagram for a method for selection of a function generating interaction layer, according to an aspect of the present invention.

FIG. 9 illustrates a flow diagram 900 of a method that can be implemented by using the computing system of FIG. 8, according to an aspect of the present invention. At 902, a touch screen event is received. At 904, the touch screen event is classified according to the touch type. By way of example, if the classifier recognizes that the touch type is a finger pad or tip, it attributes the touch to an application layer such as simple application activation by virtue of touching a corresponding icon (906). However, if the classifier recognizes that that touch type is of a finger knuckle, for example, it attributes the touch to a gesture layer such as a drag path interpreted as a letter corresponding to an entirely separate and distinct action such as camera activation or a non-drag event that has been previously defined by the user such as device audio volume (908). If the gesture layer is selected by the classifier then one or more functions associated with the gesture layer are activated (910).

Figure 10:
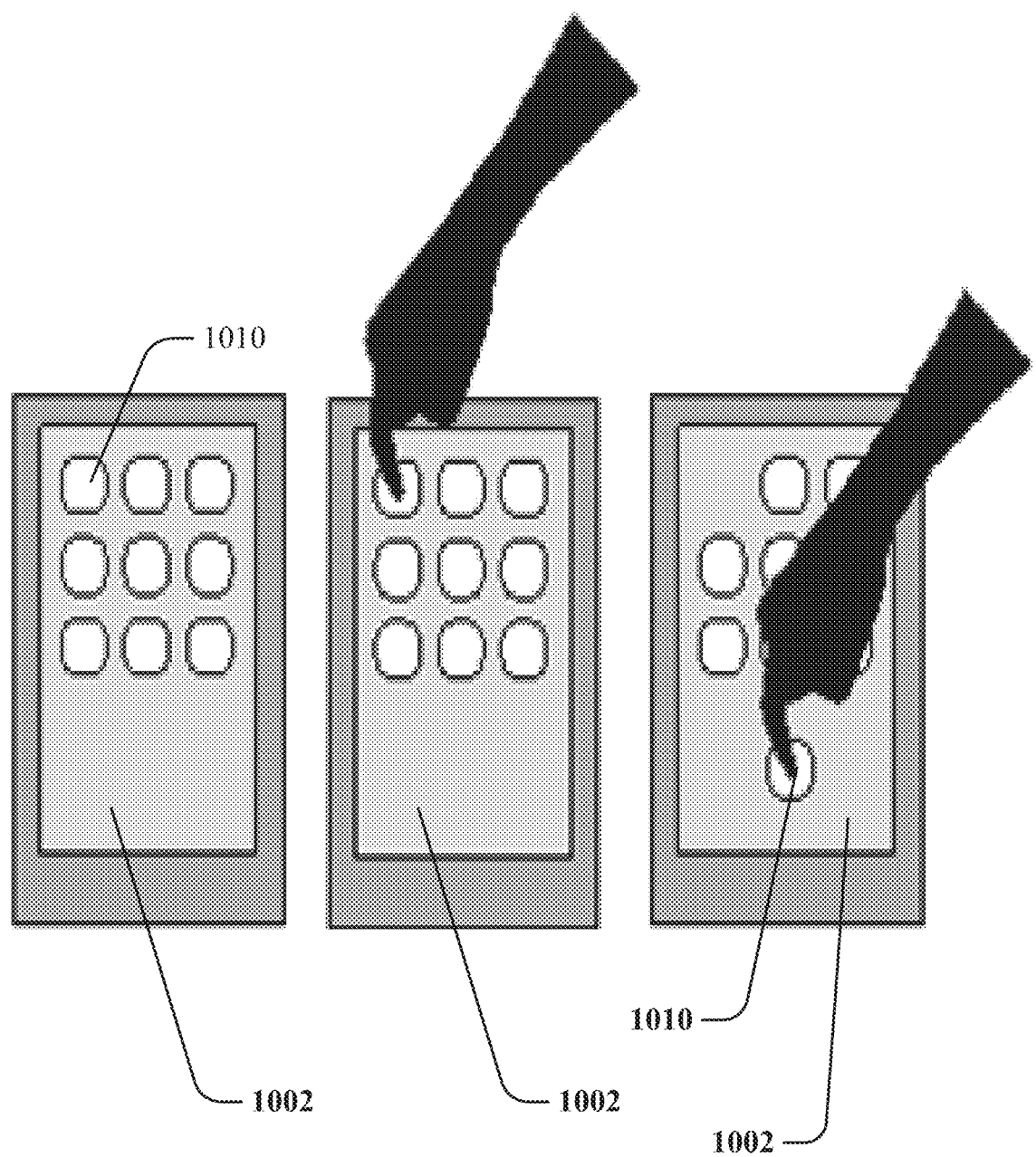
FIG. 10 illustrates an example activation of a function in an application layer caused by a fingertip touch of the touch screen, according to an aspect of the present invention.

According to an aspect of the subject disclosure, the user may use his/her fingertip, fingernail and knuckle to interact with multiple interaction layers including the conventional application layer (e.g. applications that are running) and other auxiliary layers (e.g. gestures that cannot be accessed by way of visible icons on the touch screen). Thus, one layer is the traditional application layer and finger tips and pads can as usual interact with it. FIG. 10 illustrates an example of a user's interaction with the conventional application layer. As shown in FIG. 10, the touch screen 1002 includes icons associated with various applications and the user uses his/her fingertip to change the location of the icon 1010 on the touch screen 1002. The user is able to drag the icon 1010 with his/her fingertip.

Figure 11:
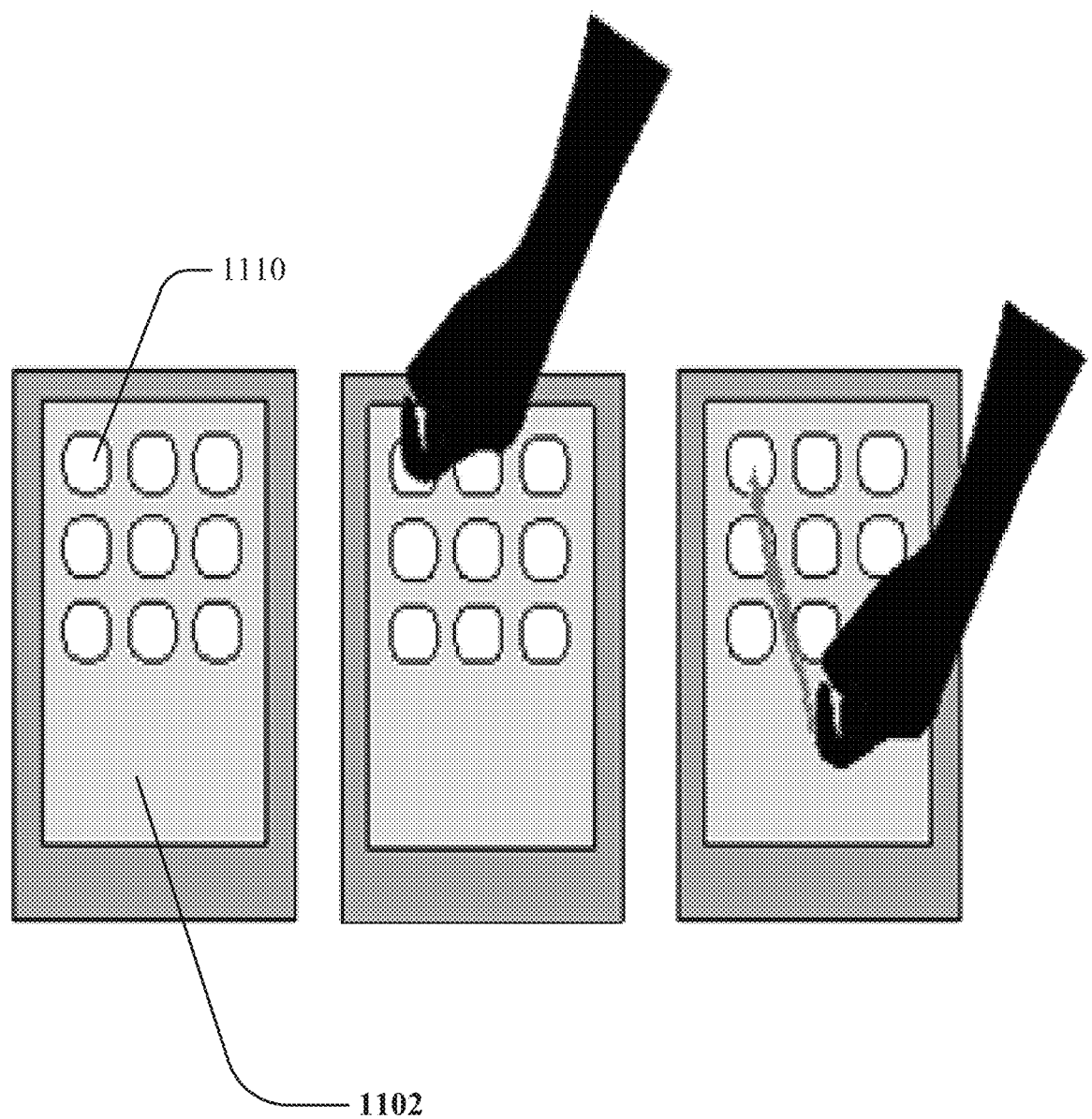
FIG. 11 illustrates that a fingernail touch does not activate functions of an application layer, according to an aspect of the present invention.

However, according to an aspect of the present invention, if a gesture is performed with another part of the finger (e.g., knuckle, nail), the events are retained and used in an entirely separate layer of the interface, and not passed through to a running application. FIG. 11 illustrates an example of a user's interaction with the touch screen by using his/her fingernail. As shown in FIG. 11, the user is unable to drag the application icon 1110 across the touch screen 1102 by using his/her knuckle. Thus, according to FIGS. 10 and 11, the user's fingertip interacts with the applications layer and the user's knuckle interacts with a different layer (e.g. a gestures layer) and is ignored by the applications layer. According to an aspect of the present invention, if a knuckle is used, it is interpreted as a gesture. As illustrated in FIG. 11, a mark can be rendered onto the touch screen 1102 that tracks the movement of the knuckle (e.g., a red line).

The following are some examples of gestures, which when performed by a user (e.g. by using a knuckle) are classified as touch events that are not passed to the traditional application layer.

Example 1

The drag path can be interpreted as a letter gesture. For example, dragging a "W" shape with the knuckle can launch the "web browser". Dragging a "S" can put the phone into silent mode. Dragging a "M" can be a gesture for mail and dragging a "J" could call Julia, etc. It is to be appreciated that functions of the gestures layer need not be limited to launching applications. For example, dragging a "C" with a knuckle might launch the camera, take a photo, and post it to social media service (e.g., Instagram).

Example 2

Non-dragging events (e.g., touches) can also be used in the gestures layer. For example, a double tap with the knuckle can also be considered a gesture, for example, to launch the camera.

Example 3

The drag path can be interpreted as a shape. For example, a repeating clockwise circling motion can increase the volume of the device, while a counter clockwise motion can decrease volume. Certain shapes can also launch certain functionality, such as a circle for a quick photo capture. Additionally, a square can be used to simultaneously define and also capture a region of the screen.

All of the above actions can be defined by the user (e.g., "C" gesture can be bound to any option of the user's choosing). The gesture could also be multitouch. For example, two knuckles dragged downward could put the phone into silent mode. The user can also define the roles of various finger parts in interactions with the touch screen. For example, one of the fingertip, finger nail or the knuckle can be used for interacting with the applications layer and one of the fingertip, finger nail and the knuckle can be used for interacting with the gestures layer.

Additionally, gestures can be application or context specific. For example a 'C' gesture can launch the calendar app at office locations, but a camera app at home or outside. Alternatively, a 'C' gesture could by default launch the Camera app, but when inside of e.g., a painting application, the application can override the system-level gesture, and instead use it to activate a color pallet.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory ("ROM") and random access memory ("RAM").

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While the present invention has been shown and described with respect to the exemplary embodiments, the present invention is not limited thereto. It will be understood by those skilled in the art that various changes and modifications may be made without departing from the scope of the present invention as defined in the following claims.

What is claimed is:

1. A system for classifying finger touch events, the system comprising:
 a touch event detector configured to detect touch events when an interactive element displayed on a touch screen is touched by a finger part of a user, and wherein touch and vibro-acoustic signals are generated by a touch event; and
 a classifier coupled with the touch event detector and configured to classify the touch and vibro-acoustic signals, wherein an interaction layer of different interaction layers is used according to classification of the touch and vibro-acoustic signals based on the finger part used to touch the interactive element.

2. The system of claim 1, wherein activation of a first function associated with a first interaction layer or activation of a second function associated with a second interaction layer is based on classification of the touch and vibro-acoustic signals and wherein said first and second functions are different functions of said system.

3. The system of claim 1, wherein first and second finger parts are detected as distinctly different touch screen events.

4. The system of claim 3, wherein the touch event detector is sensitive to distinguishing signal characteristics resulting from touching by said first finger part and said second finger part, the system further comprising one or more vibro-acoustic sensors coupled with the touch event detector and configured to sense the vibro-acoustic signals generated by the touch event.

5. The system of claim 4, wherein the one or more vibro-acoustic sensors comprise an impact sensor, a vibration sensor, an accelerometer, a gyroscope, a strain gauge, a Piezo electric element, or an acoustic sensor.

6. The system of claim 5, wherein the acoustic sensor is a condenser microphone, a piezoelectric microphone or a MEMS microphone.

7. The system of claim 4, wherein the touch event detector is operable to save the touch and vibro-acoustic signals in a buffer and transmit the touch and vibro-acoustic signals to the classifier to enable the classifier to classify the touch and vibro-acoustic signals.

8. The system of claim 7, wherein the classifier is configured to identify whether the finger part is a first finger part or a second finger part of the user that touched the interactive element based on classifying the touch and vibro-acoustic signals.

9. The system of claim 8, wherein the first finger part is a finger tip and the second finger part is a finger knuckle.

10. The system of claim 8, wherein the first finger part is a finger pad and the second finger part is a finger knuckle.

11. The system of claim 8, wherein the first finger part is a finger pad and the second finger part is a finger nail.

12. The system of claim 8, wherein each of said first and second finger parts is a different one of a finger pad, a fingertip, a finger nail, and a finger knuckle.

13. The system of claim 8, wherein the classifier comprises:
 a first segmentation unit configured to convert and segment the vibro-acoustic signals into a digital representation of the vibro-acoustic signals;
 a second segmentation unit configured to generate a digital representation of the touch signals;
 a conversion unit coupled to the first and second segmentation units and configured to convert the digital representations of the vibro-acoustic and touch signals into electrical signals;
 a feature extraction unit coupled to the conversion unit and configured to derive a series of features from the electrical signals; and
 a classification unit coupled to the feature extraction unit and configured to use the series of features to distinguish whether a finger part used for the touch event is the first finger part or the second finger part.

14. The system of claim 13, wherein the first and second segmentation units are configured to sample the touch and vibro-acoustic signals using a sliding window of samples of the respective touch and vibro-acoustic signals.

15. The system of claim 14, wherein the conversion unit is configured to perform a Fourier Transform on the sampled touch and vibro-acoustic signals having time domain representation to generate the electrical signals having frequency domain representation, and wherein the feature extraction unit is configured to calculate a series of features from the frequency domain representation of the electrical signals.

16. A method for classifying touch events, the method comprising:
 detecting touch events when an interactive element displayed on a touch screen is touched by a finger part of a user, wherein touch and vibro-acoustic signals are generated by a touch event;
 classifying the touch and vibro-acoustic signals;
 determining the finger part used to touch the interactive element on the touch screen based on classification of the touch and vibroacoustic signals, wherein an interaction layer of different interaction layers is used according to the classification of the touch and vibro-acoustic signals based on the finger part used to touch the interactive element.

17. The method of claim 16, further comprising activating a first function associated with a first interaction layer or a second function associated with a second interaction layer based on determining whether a first finger part or a second finger part is used to touch the interactive element on the touch screen, wherein said first and second interaction layers are different interaction layers.

18. The method of claim 17, wherein classifying the touch and vibroacoustic signals comprises:
 segmenting the touch and vibro-acoustic signals into digital representations;
 converting the digital representation of the touch and vibro-acoustic signals into electrical signals; and
 deriving a series of features from the electrical signals.

19. The method of claim 18, wherein segmenting the touch and vibro-acoustic signals comprise sampling the touch and vibro-acoustic signals using a sliding window of samples of the touch and vibro-acoustic signals.

20. The method of claim 19, wherein converting the digital representation of the touch and vibro-acoustic signals comprises performing a Fourier Transform on sampled the touch and vibro-acoustic signals having time domain representation to generate the electrical signals having frequency domain representation.

21. The method of claim 20, wherein deriving the series of features comprise calculating a series of features from the frequency domain representation of the electrical signals, and distinguishing whether a finger part used for the touch event is the first finger part or the second finger part based on the series of features.

22. The method of claim 17, wherein each of said first and second finger parts is a different one of a finger pad, a fingertip, a finger nail and a finger knuckle.

23. A non-transitory computer readable medium containing instructions for classifying touch events, wherein execution of the program instructions by a processor causes the processor to carry out the steps of:
   detecting touch events when an interactive element displayed on a touch screen is touched by a finger part of a user, wherein the touch events result in generating touch and vibro-acoustic signals;
   classifying at least one of the touch and vibro-acoustic signals; and
   determining the finger part used to touch the interactive element on the touch screen based on classification of the at least one of the touch and vibro-acoustic signals, wherein an interaction layer of different interaction layers is used according to the classification of the at least one of the touch and vibro-acoustic signals based on the finger part used to touch the interactive element.

24. The computer readable medium recited in claim 23 further comprising processor steps to associate a first interaction layer with a running program function and to associate a second interaction layer with a gesture function.

* * * * *